(12) United States Patent
Miyata

(10) Patent No.: US 9,946,142 B2
(45) Date of Patent: Apr. 17, 2018

(54) LIGHT SOURCE DEVICE AND PROJECTOR HAVING THE LIGHT SOURCE DEVICE

(71) Applicant: NICHIA CORPORATION, Anan-shi, Tokushima (JP)

(72) Inventor: Tadaaki Miyata, Yokohama (JP)

(73) Assignee: NICHIA CORPORATION, Anan-Shi (JP)

( * ) Notice: Subject to any disclaimer, the term of this patent is extended or adjusted under 35 U.S.C. 154(b) by 81 days.

(21) Appl. No.: 15/013,225

(22) Filed: Feb. 2, 2016

(65) Prior Publication Data
US 2016/0223891 A1 Aug. 4, 2016

(30) Foreign Application Priority Data

Feb. 2, 2015 (JP) ................................. 2015-018694
Jan. 22, 2016 (JP) ................................. 2016-010866

(51) Int. Cl.
*G03B 21/20* (2006.01)
*H04N 9/31* (2006.01)
(Continued)

(52) U.S. Cl.
CPC .............. *G03B 21/204* (2013.01); *F21K 9/64* (2016.08); *F21V 9/16* (2013.01); *F21V 13/02* (2013.01);
(Continued)

(58) Field of Classification Search
CPC .............. G03B 21/204; G03B 21/2013; G03B 21/2033; G03B 21/208; H04N 9/3152;
(Continued)

(56) References Cited

U.S. PATENT DOCUMENTS

| | | |
|---|---|---|
| 2012/0249972 A1 | 10/2012 | Kurosaki |
| 2013/0088471 A1 | 4/2013 | Kitano |
| 2016/0065919 A1* | 3/2016 | Miyata ................. G02B 26/008 353/31 |

FOREIGN PATENT DOCUMENTS

| | | |
|---|---|---|
| JP | 2007-156057 A | 6/2007 |
| JP | 2011-065770 A | 3/2011 |

(Continued)

OTHER PUBLICATIONS

European Search Report application No. 16153919.2 dated Jun. 10, 2016.

*Primary Examiner* — William C Dowling
*Assistant Examiner* — Ryan Howard
(74) *Attorney, Agent, or Firm* — Squire Patton Boggs (US) LLP

(57) ABSTRACT

A light source device includes light sources having semiconductor lasers, a condensing lens, an optical component between the light sources and the condensing lens, and a phosphor wheel. The optical component has an inclined optical surface, and the inclined optical surface has different inclination angles for each of the light sources. Some of the semiconductor lasers are first semiconductor lasers having a short axis of the shape of its condensing spot aligned in a first direction and some of them are second semiconductor lasers having a short axis in a second direction that is different from the first direction. A light diffusing layer is disposed in the optical path of the emitting light of either the first semiconductor laser or the second semiconductor laser. A light scattering layer is disposed in the optical path of the emitting light of either the first semiconductor laser or the second semiconductor laser.

20 Claims, 12 Drawing Sheets

(51) Int. Cl.
  *F21V 13/02*   (2006.01)
  *H04N 5/74*   (2006.01)
  *G03B 21/00*   (2006.01)
  *F21V 29/70*   (2015.01)
  *F21V 9/16*   (2006.01)
  *F21V 14/08*   (2006.01)
  *F21K 9/64*   (2016.01)
  *F21Y 101/00*   (2016.01)

(52) U.S. Cl.
  CPC .............. *F21V 14/08* (2013.01); *F21V 29/70* (2015.01); *G03B 21/005* (2013.01); *G03B 21/208* (2013.01); *H04N 5/7416* (2013.01); *F21Y 2101/00* (2013.01); *G03B 21/2013* (2013.01); *H04N 9/3164* (2013.01)

(58) Field of Classification Search
  CPC ...... H04N 9/3161; H04N 9/3164; F21K 9/64; F21V 13/02
  See application file for complete search history.

(56) References Cited

FOREIGN PATENT DOCUMENTS

| | | |
|---|---|---|
| JP | 2011-133782 A | 7/2011 |
| JP | 2012-159603 A | 8/2012 |
| JP | 2012-215633 A | 11/2012 |
| JP | 2014-119670 A | 6/2014 |

\* cited by examiner

Collimating Lens Offset Position 12  13  70

Shape of Condensing Point

Optical Intensity

Collimating Lens
Offset Position + Light Diffusing Layer

Shape of
Condensing Point

Optical Intensity

Light-Incident Surface Side

Light-Emission Surface Side

LIGHT SOURCE DEVICE AND PROJECTOR HAVING THE LIGHT SOURCE DEVICE

CROSS-REFERENCE TO RELATED APPLICATION

The present application claims priority to Japan Patent Application Nos. 2015-018694 filed Feb. 2, 2015, and 2016-010866 filed Jan. 22, 2016, both of which are incorporated herein by reference in their entireties.

BACKGROUND

Field

Embodiments of the present invention relate to a light source device and a projector having the light source device.

Description of the Related Art

In recent years, time-sharing type projectors have become popular, in which, light of a plurality of wavelengths is extracted in a time sharing manner, and the extracted light of a plurality of wavelengths is successively modulated to form and project an image. With such a light source device, light such as a white light emitted from the light source is allowed to incident on the rotating wheel that is spinning at a constant speed, and light of a plurality of wavelengths (e.g., a blue light, a green light, a red light) can be extracted in a time sharing manner.

Also, there has been proposed a light source device, that includes a light source such as a semiconductor laser configured to emit light of a single wavelength, and a rotating wheel in which fluorescent layers are arranged in place of color filters, and light of a single wavelength emitted from a light source such as a semiconductor laser is allowed to incident on the rotating wheel so that light of a plurality of wavelengths is extracted in a time sharing manner. For example, blue light emitted from a semiconductor laser can be converted by the phosphor into green light or red light.

One example of such a device is proposed in JP 2011-133782A where in order to obtain a uniform luminance at the time of projecting light, a plurality of laser light sources each emits light of substantially elliptical cross-section are arranged so that major axes directions of the elliptical cross-sections of the laser light sources are changed sequentially to widen the projecting area when light emitted from a plurality of laser light sources are condensed on the phosphor layer.

Also, in a device proposed in JP 2012-215633A, a plurality of laser light sources are arranged at an interval with each other and the collimator lenses disposed at emission surface side and corresponding to respective laser light sources are arranged with shifted distances so that light of the laser light sources are condensed on different points on the phosphor layer, so that the light density can be decreased when exciting the phosphor.

Also, in a device proposed in JP 2012-159603A, a diffraction optical element is disposed between a laser light source and a phosphor wheel so that the laser beams can be condensed on a plurality of points on the phosphor layer, and thus the light density can be decreased when exciting the phosphor.

As in the light source device shown in JP 2011-133782A, in the case where a plurality of laser light sources each emits light of substantially elliptical cross-section are arranged so that major axes directions of the elliptical cross-sections of the laser light sources are changed sequentially, the major axes directions of the laser light sources are needed to be adjusted, respectively. In addition, the laser beams are condensed on a same location, resulting in a high light density in the center portion and a decrease in the luminous efficiency of the phosphor.

In the case of the light source device shown in JP 2012-215633A, light of the laser light sources are condensed on different points that allows for a change of the condensed point, but a parallel light emitted from the collimating lens has a high light density due to its small condensing diameter, which may result in a decrease in the luminous efficiency. Moreover, in the light source devices shown in JP 2011-133782A and JP 2012-215633A, the beam shape at the condensed region of the condensing lens depends on the far field pattern or the near field pattern of the semiconductor laser, so that a beam shape of desired size and/or a beam shape of desired aspect ratio is difficult to obtain.

In the case of the light source device shown in JP-2012-159603A, the use of the diffraction optical element requires a high cost.

SUMMARY

A light source device according to one embodiment of the invention includes a plurality of light sources each having a semiconductor laser and a collimating lens, a condensing lens to condense light from the light sources, an optical component disposed between the light source and the condensing lens, and a phosphor wheel having a phosphor and allowing light condensed by the condensing lens to pass therethrough. The optical component has an inclined optical surface that inclines from the plane perpendicular to the optical axis of the collimating lens, and the inclined optical surface has different inclination angles for each of the light sources. Some of the semiconductor lasers are first semiconductor lasers having a short axis of the shape of its condensed spot aligned in a first direction and some of the semiconductor lasers are second semiconductor lasers having a short axis of the shape of its condensed spot aligned in a second direction that is different from the first direction. A light diffusing layer is disposed in the optical path of the emitting light of either the first semiconductor laser or the second semiconductor laser. A light diffusing layer is disposed in the optical path of the emitting light of either the first semiconductor laser or the second semiconductor laser.

A projector according to one embodiment includes a light source device according to the above-described embodiment, a light modulating device to form an image by successively modulating light of a plurality of wavelengths emitted by the light source device, based on image data, and a projecting device enlarging and projecting the image.

As described above, a light source device according to one embodiment employs a plurality of semiconductor lasers, and can reduce a decrease in the luminous efficiency of the phosphor. Further, in the light source device, a condensed spot shape (beam shape) with a desired size and a desired aspect ratio can be obtained at its condensed region, and the light source device can be provided with a low manufacturing cost. Consequently, a projector employing the light source device can be provided with a low manufacturing cost.

DETAILED DESCRIPTION

Figure 1A:
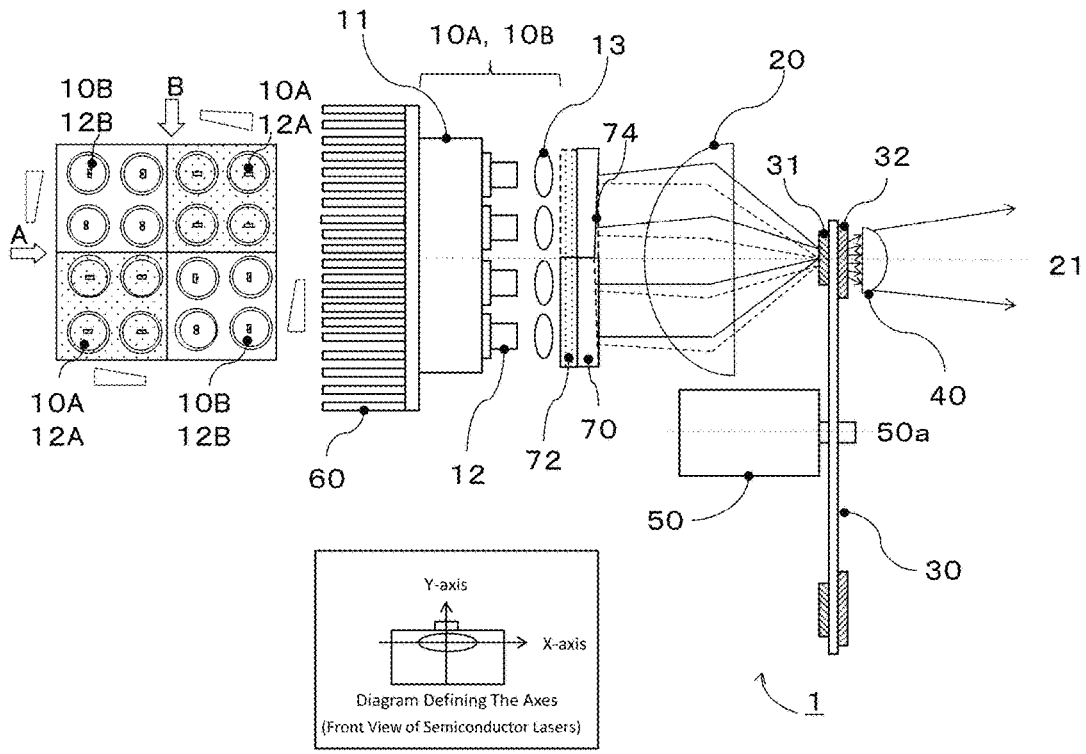
FIG. 1A is a diagram including a schematic plan view illustrating a light source device according to one embodiment of the invention.

A light source device according to Embodiment 1 of the present invention includes a plurality of light sources each having a semiconductor laser and a collimating lens, a condensing lens to condense light from the light sources, an optical component disposed between the light source and the condensing lens, and a phosphor wheel having a phosphor and allowing light condensed by the condensing lens to pass therethrough. The optical component has an inclined optical surface that inclines from the plane perpendicular to the optical axis of the collimating lens, with different inclination angles for each of the light sources. Some of the semiconductor lasers are first semiconductor lasers having a short axis of the shape of its condensed spot aligned in a first direction and some of the semiconductor lasers are second semiconductor lasers having a short axis of the shape of its condensed spot aligned in a second direction that is different from the first direction. A light diffusing layer is disposed in the optical path of the emitting light of either the first semiconductor laser or the second semiconductor laser. A light diffusing layer is disposed in the optical path of the emitting light of either the first semiconductor laser or the second semiconductor laser.

According to the present embodiment, the optical component disposed between the light sources and the condensing lens has an inclined optical surface that inclines from the plane perpendicular to the optical axis of the collimating lens, with different inclination angles for each of the light sources. Thus, light emitted from the light sources are condensed by the condensing lens to different locations on the phosphor wheel (that is, on the phosphor). With this configuration, the light density at the condensing regions on the phosphor can be reduced, so that the emission from the phosphor can be efficiently used.

Further, some of the semiconductor lasers are first semiconductor lasers having a short axis of the shape of its condensed spot aligned in a first direction and some of the semiconductor lasers are second semiconductor lasers having a short axis of the shape of its condensed spot aligned in a second direction that is different from the first direction, and a light diffusing layer is disposed in the optical path of the emitting light of either the first semiconductor lasers or the second semiconductor lasers, so that condensed spot shapes (i.e., beam shapes to condensed spots, hereinafter may be abbreviated to "beam shapes") of different sizes are produced. Thus, the condensed spot shape (beam shape) of a desired size and a desired aspect ratio can be obtained at the condensing region of the condensing lens.

Further, the use of an expensive component such as a diffraction optical element is not required. Thus, according to the present embodiment, the light source device that employs a plurality of semiconductor lasers, and in which a decrease in the luminous efficiency of the phosphor can be reduced and further, a condensed spot shape (beam shape) with a desired size and a desired aspect ratio can be obtained at its condensed region, can be provided with a low manufacturing cost.

The expression "the optical component has different inclined optical surfaces which are different for each of the light sources" includes the case of different inclination angles and also the case where inclined optical surfaces of a same inclination angle are disposed in different directions. Also, the case where some of the light sources may have a same inclination angle and are disposed in a same direction. Further, in the case where the inclination angles of a same inclination angle are disposed in a same direction and adjacent to each other, the inclined optical surfaces that are adjacent to each other may be integrally formed. The optical component is formed corresponding to each of the light sources, in which, one optical member may be provided corresponding to a plurality of light sources. The optical component is formed for each of the light sources, so that a very suitable condensed spot shape (beam shape) can be obtained, and thus, detailed adjustments can be performed.

A light source device according to Embodiment 2 of the invention has a configuration as described in Embodiment 1, in which the light diffusing layer is formed on the optical surface of the optical component.

According to the present embodiment, the light diffusing layer is formed on the optical surface of the optical component, so that a condensed spot shape (beam shape) with a desired aspect ratio can be obtained in a compact light source device.

Also, in some cases the light diffusing layer may be disposed on the inclined optical surface of the optical component, and in some cases the light diffusing layer may be disposed on the optical surface that is perpendicular to the optical axis of the collimating lens of the optical component.

A light source device according to Embodiment 3 has a configuration as described in Embodiment 1 or 2, where, of the plurality of light sources, two first light sources having the inclined optical surface provided by 180° to the opposite direction and two second light sources having the inclined optical surface provided by 180° to the opposite direction are at least included.

According to the present embodiment, two first light sources having the inclined optical surface provided by 180° to the opposite direction and two second light sources having the inclined optical surface provided by 180° to the opposite direction are at least included, so that two condensed spot shapes (beam shapes) formed by the first light sources and two condensed spot shapes (beam shapes) formed by the second light sources can be obtained at locations symmetrical with respect to the optical axis of the condensing lens. Thus, a condensed spot shape (beam shape)

that is widen to a predetermined degree centering the optical axis of the condensing lens can be obtained.

A light source device according to Embodiment 4 has a configuration as described in one of Embodiments 1 to 3, in which inclination of the inclined optical surface of the optical component is formed in a rotating direction that centers the long axis of the condensed spot shape of the semiconductor lasers.

According to the present embodiment, the inclination of the inclined optical surface of the optical component is formed in the rotating direction (also can be referred to as "a direction in a short axis of the condensed spot shape") that centers the long axis of the condensed spot shape of the semiconductor lasers. Thus, the region where light emitted from the semiconductor lasers overlap can be decreased and a reduction in the light density in the condensed region can be appropriately obtained.

In a light source device according to Embodiment 5 of the present invention, the first direction and the second direction are disposed at an angle of 90 degrees.

According to the present embodiment, the first direction and the second direction are disposed at an angle of 90 degrees, so that with the use of the light diffusing layer, a condensed spot shape (beam shape) with a desired aspect ratio can be securely obtained.

A light source device according to Embodiment 6 of the present disclosure has a configuration as described in Embodiment 1, in which the light diffusing layer is formed on the optical surface of the optical component.

According to the present embodiment, the light sources are fixed on a same plane of the support member, so that heat generated by the light sources can be released through a wider plane, which contributes to achieving longer operation life.

The light source device according to Embodiment 7 of the present invention has a configuration as in one of Embodiments 1 to 6, where the inclined optical surface is formed at an inclination angle in a range of 0.25 to 2 degrees with respect to the plane perpendicular to the optical axis of each of the collimating lenses.

According to the present embodiment, the inclined optical surface is formed at an inclination angle in a range of 0.25 to 2 degrees with respect to the plane perpendicular to the optical axis of each of the collimating lenses, so that light can be converged at different positions in an appropriate range.

A light source device according to Embodiment 8 has a configuration as described in one of Embodiments 1 to 7, in which each of the collimating lenses is disposed at a position different from a position along the optical axis that allows emission of parallel light.

According to the present embodiment, each of the collimating lenses is disposed at a position different from a position along the optical axis that allows emission of parallel light, so that light density in the condensing region on the phosphors can be reduced, and also the size of the condensed spot shape (beam shape) can be adjusted.

A light source device according to Embodiment 9 of the present invention has a configuration as described in one of Embodiments 1 to 8, in which the support member is a heat dissipating member.

According to the present embodiment, the support member serves as a heat dissipating member, so that the light sources can be cooled efficiently and also the number of components can be reduced to facilitate miniaturization of the light source device.

A light source device according to Embodiment 10 of the present invention has a configuration as described in one of Embodiments 1 to 9, in which the light sources emit light in a wavelength band of 370 nm to 500 nm.

A light source device according to Embodiment 11 of the invention has a configuration as described in one of Embodiments 1 to 10, in which one of the phosphors emits light that contains a red light.

Even if the phosphor configured to emit light that includes a red light tends to exhibit a large decrease in the wavelength conversion efficiency due to rise in temperature, according to the present embodiment, the light density in the condensing regions on the phosphors can be reduced, so that reduction in the wavelength conversion efficiency can be reduced.

A projector according to one embodiment includes a light source device according to the above-described embodiment, a light modulating device to form an image by successively modulating light of a plurality of wavelengths emitted by the light source device, based on image data, and a projecting device enlarging and projecting the image.

As described above, a light source device according to one embodiment employs a plurality of semiconductor lasers, and can reduce a decrease in the luminous efficiency of the phosphor. Further, in the light source device, a condensed spot shape (beam shape) with a desired size and a desired aspect ratio can be obtained at its condensed region, and the light source device can be provided with a low manufacturing cost. Consequently, a projector employing the light source device can be provided with a low manufacturing cost.

Next, a light source device according to certain embodiments and a projector equipped with the light source will be described in detail with referring to the drawings.

Figure 1B:
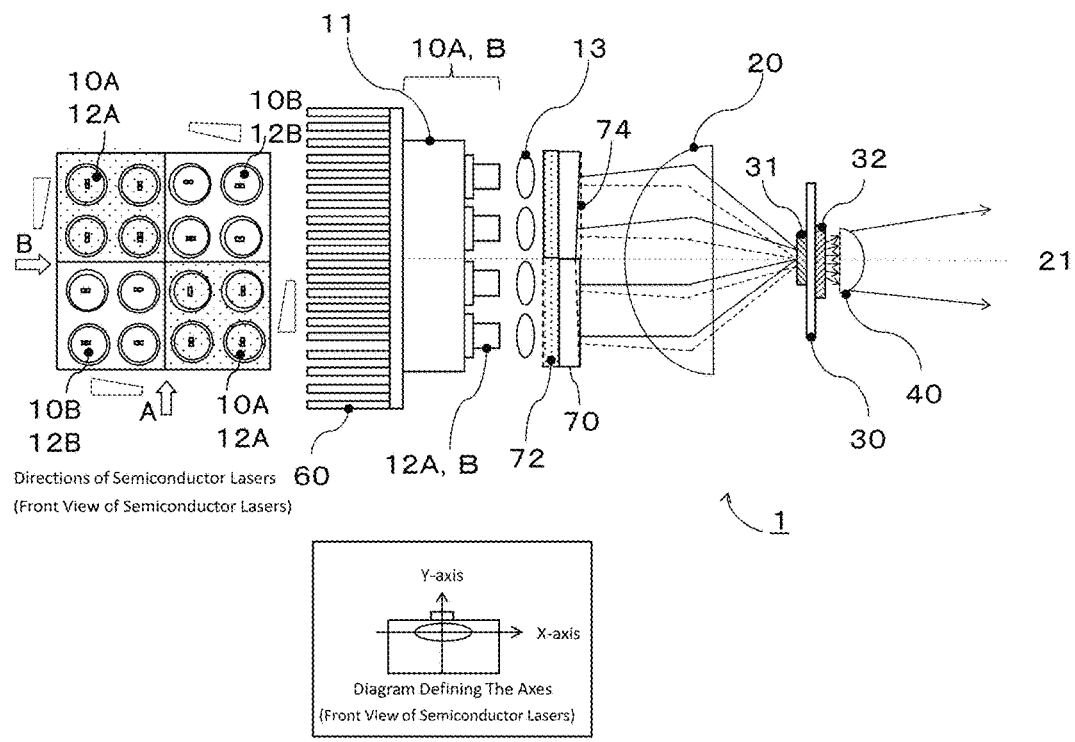
FIG. 1B is a diagram including a schematic side view illustrating a light source device according to one embodiment of the invention.

First, with reference to FIG. 1A and FIG. 1B, a light source device according to one embodiment will be described. FIG. 1A is a schematic plan view illustrating a light source device according to one embodiment, and showing a plan view of a light source device 1. Also, at a left side of FIG. 1A, a front view of the semiconductor lasers etc., is shown, in which the semiconductor lasers 12A, 12B of the light source devices 10A, 10B are seen from the condensing lens 20 side. Further, a diagram for definition of axes is shown in the lower center of the FIG. 1A to illustrate the far-field pattern and the near-field pattern of laser light emitted from a single semiconductor laser. FIG. 1B is a schematic lateral side view illustrating a light source device according to one embodiment, showing a lateral side view of a light source device. Also, at a left side of FIG. 1B, a front view of the semiconductor lasers etc., is shown, in which the semiconductor lasers 12A, 12B of the light source devices 10A, 10B are seen from the condensing lens 20 side. Further, a diagram for definition of axes is shown in the lower center of the FIG. 1A to illustrate the far-field pattern and the near-field pattern of laser light emitted from a single semiconductor laser. In the front view of the semiconductor lasers etc., of FIG. 1A and FIG. 1B, the light source device 1 viewed from an arrow A corresponds to the plan view (FIG. 1A) of the light source device of the present embodiment, and the light source device viewed from an arrow B corresponds to the lateral side view (FIG. 1B) of the light source device of the present embodiment.

First, referring to FIG. 1A showing a plan view of a light source device, an overview of the light source device according to one embodiment will be described. As shown in FIG. 1A, the light source device 1 according to the present embodiment includes light sources 10A, 10B attached to a heat dissipating member 60, a light diffusing layer 72, an optical component 70, a condensing lens 20, a phosphor wheel 30, a light receiving lens 40, and a rotation driving unit 50.

In the present embodiment, blue light is emitted from the light sources 10A, 10B and the emitted blue light passes through the light diffusing layer 72 and the optical component 70 and enters the condensing lens 20. The light is converged by the condensing lens 20 and incident on the rotating phosphor wheel 30 that is rotated by the rotation driving unit 50. The phosphor wheel 30 is made of a light-transmissive material and has a light incident side and an opposite light emitting side, a dielectric film 31 is formed on the light incident side and phosphor regions 32 are formed in the circumferential direction on the light emitting side. In more detail, a green phosphor region, a red phosphor region, and a blue-light transmitting region are disposed in the circumferential direction. The green phosphor emits green light when irradiated with blue light, and the red phosphor emits red light when irradiated with blue light. Hence, when the blue light is incident from the condensing lens 20 on the phosphor wheel 30, the blue light, the red light and the green light are time sharingly output from the phosphor wheel 30, and incident on the light receiving lens 40. Advancing directions of the lights are changed to a predetermined direction by the light-receiving lens 40. More specifically, distribution of light can be controlled by the light-receiving lens 40 to obtain spreading light or parallel light, or light condensed to a specific position.

The semiconductor lasers 12A, 12B desirably emit light having a wavelength in a range of 370 nm to 500 nm and more desirably emit light having a wavelength in a range of 420 nm to 500 nm.

Now, the light sources 10A and 10B will be described in more detail below. As shown in FIG. 1A and FIG. 1B, a total of four light sources that include two first light sources 10A and two second light sources 10B are attached on a light source mounting surface of a heat dissipating member 60 that also serves as a support member.

Each of the two first light sources 10A includes one housing 11 and four first semiconductor laser 12A to emit blue light mounted on one housing 11, and four collimating lens 13 each corresponding to each first semiconductor laser 12A. Similarly, each of the two second light sources 10B includes one housing 11 and four second semiconductor laser 12B to emit blue light mounted on one housing 11, and four collimating lens 13 each corresponding to each second semiconductor laser 12B. The first light source 10A has at least one first semiconductor laser 12A and the second light source 10B has at least one second semiconductor laser 12B. As shown in FIG. 1A and FIG. 1B, each of the light sources is provided with one housing, but four light sources may be provided with one housing.

As described above, two first light source 10A and two second light sources 10B are mounted adjacently (i.e., adjacent lateral side surfaces are in contact with each other) on one mounting surface of the heat dissipating member 60.

That is, all the light sources in the light source 10 are fixed on a same plane of the support member, so that heat generated by the light sources can be released through a wider plane, which contributes to achieving longer operation life of the light source device 1.

Further, the support member is also serves as a heat dissipating member 60, so that the light sources 10A, 10B can be cooled efficiently and also the number of components can be reduced to facilitate miniaturization of the light source device 1.

Next, referring to FIG. 1A (a plan view of the light source), a further detailed description will be provided. The semiconductor lasers are disposed such that, in the schematic diagram showing a front view of the semiconductor laser etc., on the left side in FIG. 1A, the major axis (X-axis shown in the diagram at lower part in FIG. 1A) of the near field pattern of each of the first semiconductor lasers 12A used in the first light source 10A is aligned in the perpendicular direction (that is, the right/left direction in the figure) of the light source device 1, and the major axis of the near field pattern of each of the second semiconductor lasers 12B used in the second light source 10B is aligned in the lateral direction (that is, the up/down direction in the figure) of the light source device 1.

In the present embodiment, in the front view of the semiconductor laser etc., in FIG. 1A, the right/left direction in the figure is referred to as the first direction and the up/down direction in the figure is referred to as the second direction. That is, in the present embodiment, the first direction and the second direction are disposed at an angle of 90 degrees. In other words, the first direction and the second direction form an angle of 90 degrees. In FIGS. 1A and 1B, the first direction and the second direction are shown as the up/down direction in the figure and the right/left direction in the figure, but any other appropriate directions can be employed. Further, the angle formed by the first direction and the second direction is 90 degrees in the present embodiment, but any other appropriate angle can be employed.

Further, in the present embodiment, a collimating lens 13 is offset from the position on the optical axis (i.e., focal position) at which the collimating lens produce parallel light. With this arrangement, a larger condensing area can be obtained and the light density of condensing light can be reduced as described below. Accordingly, the minor axis direction of the shape of the condensing point (i.e., minor axis direction of far field pattern) and the major axis (X-axis in the diagram at lower part in FIG. 1A) directions of the semiconductor lasers 12A are aligned, and the major axis direction of the shape of the condensing point in the conductor layer (i.e., major axis direction of far field pattern) and the minor axis (Y-axis in the diagram at lower part in FIG. 1A) directions of the semiconductor lasers 12A are aligned.

An appropriate arrangement other than the above may also be employed, and the collimating lens 13 may be disposed at the focal point position. In this case, the major axis direction of the far field pattern at the condensing region and the major axis directions of the near filed patterns of the semiconductor lasers 12A, 12B are aligned, and the minor axis direction of the near-field pattern at the condensing region and the minor axis directions of the semiconductor lasers 12A, 12B are aligned.

The optical axes of light emitted from the first semiconductor lasers 12A and the optical axes of corresponding collimating lenses 13 are aligned respectively, and are in parallel to the optical axis 21 of the condensing lens 20. Similarly, the optical axes of light emitted from the second semiconductor lasers 12B and the optical axes of corresponding collimating lenses 13 are aligned respectively, and are in parallel to the optical axis 21 of the condensing lens 20.

The optical component 70 is provided with respect to each of the first light sources 10A and the second light sources 10B. The optical component 70 has an inclined optical surface 74 that inclines from a plane perpendicular to the optical axis of the collimating lens 13. Next, the direction of inclination of the inclined optical surface 74 will be described with reference to the schematic diagram showing a front view of semiconductor lasers etc., at the left side in FIG. 1A. In the diagram, in order to clearly show the direction of inclination of the inclined optical surface 74, lateral side shape of corresponding optical components 70 are schematically shown superimposed around the front view of the semiconductor laser etc.

More specifically, in the schematic front view of the semiconductor laser etc., in FIG. 1A, the optical component 70 corresponding to the first semiconductor lasers 12A at the lower left in the figure has an inclined optical surface 74 that has an inclination in the minor axis direction (that is, the major axis directions (the right/left direction: first direction in the figure) of the near filed pattern of the semiconductor lasers 12A) of shape of the condensing point (i.e., far field pattern) in the condensing region. In more detail, the inclination is formed so that the side to the left in the figure is higher (i.e., greater in thickness) and the side to the right in the figure is lower (i.e., smaller in thickness). As described above, the inclination is formed in the minor axis direction of the shape of the condensing point (i.e., far field pattern). In other words, the inclination is formed in a rotating direction centering the major axis.

In the case where the collimating lenses 13 are disposed at the focal point positions, the inclinations of the inclined optical surface of the optical component 70 is directed to the minor axis direction of the shape of the condensing point in the condensing region.

In the schematic front view of the semiconductor laser etc., in FIG. 1A, the optical component 70 corresponding to the first semiconductor lasers 12A at the upper right in the figure has an inclination in the minor axis direction (that is, the major axis direction (the right/left direction: first direction in the figure) of the near filed pattern of the semiconductor lasers 12A) of shape of the condensing point (far field pattern) in the condensing region, so that the right side in the figure is higher and the left side in the figure is lower, as opposite to the optical component 70 corresponding to the first semiconductor lasers 12A at the lower left in the front view.

The optical component 70 corresponding to the second semiconductor lasers 12B at the lower right in the figure has an inclination in the minor axis direction (that is, the major axis direction (the up/down direction: second direction in the figure) of the near field pattern of the semiconductor laser 12B) of shape of the condensing point (far field pattern) in the condensing region, so that the lower side in the figure is higher and the upper side in the figure is lower.

In the schematic front view of the semiconductor laser etc., in FIG. 1A, the optical component 70 corresponding to the second semiconductor lasers 12B at the upper left in the figure has an inclination in the minor axis direction (that is, the major axis direction (the up/down direction: second direction in the figure) of shape of the condensing point (far field pattern) in the condensing region, so that the upper side in the figure is higher and the lower side in the figure is lower, as opposite to the optical component 70 corresponding to the second semiconductor lasers 12B at the lower right in the figure.

As described above, in the present embodiment, the light source device includes two first light sources 10A and two inclined optical surfaces 74 that have inclinations opposite to each other and provided corresponding to the first light sources 10A respectively, and two second light sources 10B and two inclined optical surfaces 74 having inclinations opposite to each other and provided corresponding to the second light sources 10B respectively. Also, an optical component 70 having an inclined optical surface 74 is formed corresponding to each of the light sources 10A, 10B so that inclination angles of the inclined optical surfaces 74 with respect to corresponding light sources 10A, 10B are different from each other.

As shown in the plan view in FIG. 1A, in the present embodiment, the inclined optical surface 74 is formed on the emission-side surface of each of the optical components 70. That is, the inclined optical surfaces 74 are formed on the side away from the light source 10. Other appropriate configurations may also be employed. For example, the inclined optical surfaces 74 may be formed on the incident side of the optical components 70, that is, on the side closer to the light source 10, or the inclined optical surface 74 is formed on both the incident side and the emission side of the optical components 70. In the case where the inclined optical surface is formed on both the incident side and the emission side of each of the optical components 70, a non-tapered plate optical component 70 may be disposed at an angle relative to corresponding unit of the light source 10.

Further, as schematically shown by dots in the front view of the semiconductor lasers etc., on the left side in FIG. 1A, the light diffusing layer 72 is provided corresponding optical components 70 that correspond to the first semiconductor lasers 12A. As shown in the plan view in FIG. 1A, in the present embodiment, the light diffusing layer 72 is formed on the emission-side surface of corresponding optical components 70. That is, the light diffusing layer 72 is formed on the side closer to the light source 10. Other appropriate configurations may also be employed. For example, the light diffusing layer 72 may be formed on the emission side of the optical component 70, that is, on the side away from the light source 10. The light diffusing layer 72 can be disposed at an appropriate location on the optical paths of light emitted from the first semiconductor lasers 12A between the collimating lenses 13 and the condensing lens 20. In the case where the light diffusing layer 72 is formed at a location away from the optical component 70, the light diffusing layer 72 may have strength sufficient to be self-supporting.

Next, the configuration shown in FIG. 1B (side view of the light source) will be described. FIG. 1B is a side view of the light source device as seen from the arrow B side in the front view of the semiconductor laser etc., on the left side in the figure, and corresponds to the light source device 1 that is turn 90 degrees frontward from the state shown in the plan view in FIG. 1A.

In the front view of the semiconductor laser etc., on the left in FIG. 1B, the optical component 70 corresponding to the first semiconductor lasers 12A at the lower right in the figure has an inclination in the minor axis direction (that is, the major axis directions (the up/down direction: first direction in the figure) of the near filed patterns of the semiconductor lasers 12A) of the shape of the condensing point (i.e., far field pattern) in the condensing region, so that the lower side in the figure is higher (i.e., thicker) and the upper side in the figure is lower (i.e., thinner).

In the front view of the semiconductor laser etc., on the left in FIG. 1B, the optical component 70 corresponding to the first semiconductor lasers 12A at the upper left in the figure has an inclination in the minor axis direction (that is, the major axis directions (the up/down direction: first direction in the figure) of the near filed patterns of the semiconductor lasers 12A) of the shape of the condensing point (i.e., far field pattern) in the condensing region, so that the upper side in the figure is higher and the lower side in the figure is lower, as opposite to the optical component 70 corresponding to the first semiconductor lasers 12A at the lower right in the figure.

In the front view of the semiconductor laser etc., on the left in FIG. 1B, the optical component 70 corresponding to the second semiconductor lasers 12B at the lower left in the figure has an inclination in the minor axis direction of the shape of the condensing point (i.e., far field pattern) in the condensing region, (that is, the major axis direction (the left/right direction: second direction in the figure) of the near filed patterns of the semiconductor lasers 12A)) so that the left side in the figure is higher and the right side in the figure is lower.

In the front view of the semiconductor laser etc., on the left in FIG. 1B, the optical component 70 corresponding to the first semiconductor lasers 12A at the upper left in the figure has an inclination in the minor axis direction of the shape of the condensing point (i.e., far field pattern) in the condensing region, that is, the major axis direction (the up/down direction: first direction in the figure) of the near filed pattern of the semiconductor lasers 12A) so that the right side in the figure is higher and the left side in the figure is lower, as opposite to the optical component 70 corresponding to the second semiconductor lasers 12B at the lower left in the front view.

As described above, the inclination is formed in the minor axis direction of the shape of the condensing point (i.e., far field pattern). In other words, the inclination is formed in a rotating direction centering the major axis of the shape of the condensing point (i.e., far field pattern).

With the configuration described above, propagating directions of light emitted from the first light sources 10A and the second light sources 10B in parallel to the optical axis 21 of the condensing lens 20 are bent at the inclined optical surfaces of the optical components 70 toward lower (thinner) direction and incident on the condensing lens 20 at predetermined angles with respect to the optical axis 21. As described above, the inclining directions of the inclined optical surfaces 74 corresponding to the four light sources 10A, 10B differ from each other, so that light from the four light sources are condensed at different positions on the phosphor section 32. FIGS. 1A and 1B depict the light is condensed on the surface positions of the dielectric film 31 disposed on the incident-side surface of the phosphor wheel 30, but the dielectric film 31 is very thin and the phosphor wheel 30 does not contributes to neither condensing nor diffusing of light, so that it can be assumed that light from the light sources are condensed at different positions on the phosphor section 32.

In the case of passing through the diffusion layer 72, the light becomes diffused light, and a spread shape of light is obtained at the condensing position. The optical components 70 and the light diffusing layer 72 will be described in detail later below.

Figure 4A:
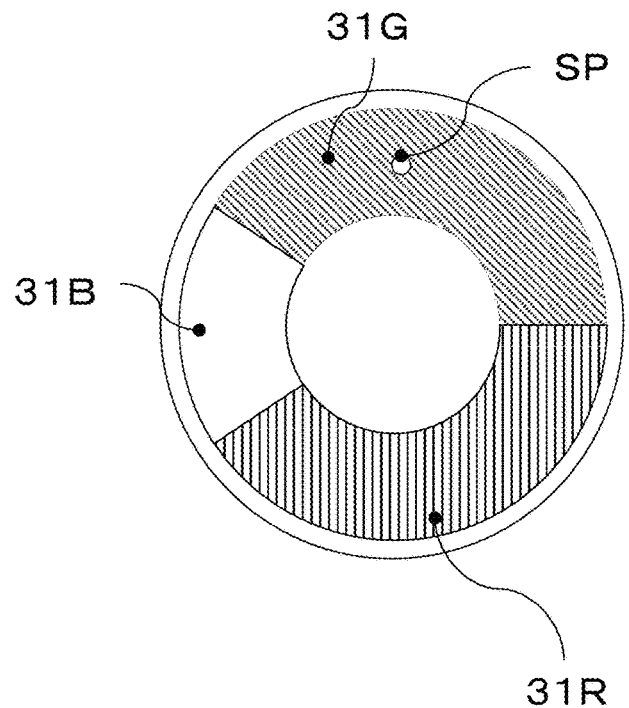
FIGS. 4A and 4B are schematic plan diagrams of a phosphor wheel according to one embodiment of the invention.
Figure 4B:
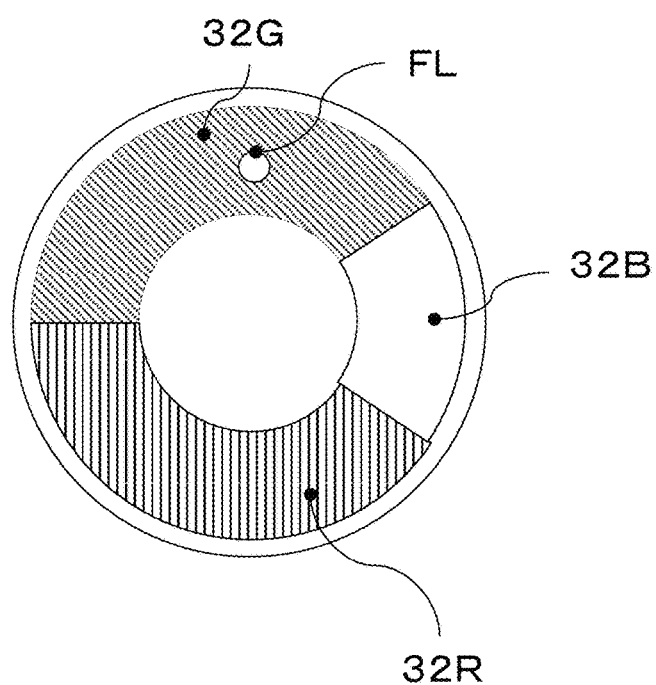

As described above, the phosphor wheel 30 has a dielectric film 31 formed on the incident side and a phosphor region 32 formed in a circular ring shape on the emission side. FIGS. 4A and 4B are schematic diagram of a phosphor wheel according to one embodiment. FIG. 4A shows an incident side of the phosphor wheel 30 and FIG. 4B shows an emission side of the phosphor wheel 30. A green phosphor region, a red phosphor region, and a blue-light transmitting region are disposed on the phosphor wheel 30. The green phosphor region has a dielectric film 31G that is configured to transmit blue light and reflect green light is formed on the incident side, and a phosphor 32G to emit light in green wavelength band is applied on the emission side. In a similar manner, the red phosphor region has a dielectric film 31R that is configured to transmit blue light and reflect red light is formed on the incident side, and a phosphor 32R to emit light in red wavelength band is applied on the emission side. The blue-light transmitting region has a dielectric film 31B that is configured to transmit blue light is formed on the incident side, and a phosphor is not applied on the emission side. But a dielectric film 32B that is configured to transmit blue light as on the emission side may be formed on the emission side. In order to reduce unevenness in luminance and chromaticity, a diffusion agent such as particles of $SiO_2$, $TiO_2$, $Ba_2SO_4$, or the like is preferably applied.

The dielectric films 31G, 31R formed on the green phosphor region and red phosphor region of the phosphor wheel 30 are configures to transmit blue light and reflect light of wavelengths corresponding to each of the regions. Accordingly, light emitted from the phosphors 32G, 32R toward the semiconductor laser 12 side can be reflected by the light-receiving lens 40 side. Thus, light emitted from the phosphors can be used efficiently.

The phosphor 32G applied in the green phosphor region of the phosphor wheel preferably can emit green fluorescent light that includes a wavelength band of about 500 to about 560 nm. Specific examples of the green phosphor include $\gamma\text{-}Si_{6-z}AB_zO_zN_{8-z}$:EA, $BA_3AB_5O_{12}$:Ce, $Ca_8MgSi_4O_{16}C_{B2}$:EA, $Ba_3Si_6O_{12}N_2$:EA, and (Sr, Ba, Ca)$Si_2O_2N_2$:EA.

The phosphor 32R applied in the red phosphor region of the phosphor wheel preferably can emit red fluorescent light that includes a wavelength band of about 600 to about 800 nm. Specific examples of the red phosphor include (Sr, Ca)ABSiN$_3$:EA, CaABSiN$_3$:EA, SrAB SiN$_3$:EA, and $K_2SiF_6$:Mn.

The proportion of the green phosphor region, red phosphor region, and blue-light transmitting region on the phosphor wheel 30 can be determined as needed. For example, in the case of using the phosphor wheel 30 in a projector, an appropriate proportion can be calculated from the chromaticities of white and the efficiency of the phosphors required of a projector and the like. In the present embodiment, the green and red phosphor regions are respectively set to 150 degrees, and the blue-light transmitting region is set to 60 degrees.

Further, in the present embodiment, three regions of green, red, and blue are provided, but four or more regions may be provided. A white light region where white light is formed by blue light and yellow light may be provided, and/or number of the green, red, and blue regions may be increased to two respectively.

The phosphor wheel 30 is made of a light-transmissive disk-shaped member and its center is fixed to a driving shaft 50a of a rotation driving unit 50. Materials of high light transmittance such as glass, a resin, sapphire, or the like, can be used for the phosphor wheel 30. In FIG. 4A, the area indicated as "SP" is a region (condensing region) where incident light from the light source 10 that is condensed by the condensing lens 20 is irradiated. Further, in FIG. 4B, the area indicated as "FL" is a region (fluorescent light region) where the phosphor layer emits light upon receiving incident light from the light source 10.

Moreover, one more substrate may be added at the emission side of the phosphor wheel 30 and a band pass filter may be provided. With this configuration, lights of a purer green color and a purer red color can be obtained.

Returning to FIG. 1A and FIG. 1B, the rotation driving unit 50 is a brushless DC motor and disposed such that its driving shaft and the optical axis of the condensing lens 20 are in parallel to each other. Further, the drive motor 50 is fixed such that the plane of the phosphor wheel 30 becomes perpendicular to the driving shaft 50a. The rotation speed of the rotation drive unit 50 is determined based on the frame rate (the number of frames per second, represented by unit of [fps]) of the reproduced moving images. For example, in the case of reproducing moving images of 60 [fps], the rotation speed of the rotation driving unit 50 (i.e., the phosphor wheel 30) may be determined to an integral multiple of 60 rotations per minute.

Advancing directions of the lights emitted from the phosphor wheel 30 are changed to a predetermined direction by the light-receiving lens 40 and emitted from the light source device 1. More specifically, distribution of light can be controlled by the light-receiving lens 40 to obtain spreading light or parallel light, or light condensed to a specific position. In the case where the light source device 1 is used as the light source of a projector, light emitted from the light source device 1 is condensed to a light modulating device, and an image formed by the light modulating device is enlarged and projected on a screen by a projecting device. At this time, etendue calculated from the relationship between the size of the image formed by the light modulating device and the spreading angle of light projected from the projecting device may affect NA of the light-receiving lens 40 and the size of the luminous region of the phosphor.

That is:

(size of the image made by light modulating device)×(projection angle)=(fluorescent region FL)×(light-receiving lens NA)

The phosphor emits light in approximately Lambertian distribution, so that the light-receiving lens 40 preferably has a highest possible NA. Meanwhile, the fluorescent region FL is preferably small. In the case where the etendue of the phosphor region side is larger than the etendue of the projection side, the difference corresponds to a reduction in the efficiency.

As described above, the light-receiving lens 40 has a high NA, so that the fluorescent region FL is preferably as small as possible. However, a small fluorescent region FL may result in high light density of light from the light source 10. In the present embodiment, the size of the fluorescent region FL is preferably in a range of about 1.5 to 2 mm, so that light from the light source 10 preferably has a size of 2 mm or smaller as the size of the condensing region SP 2. The size described above is of overall condensing region with a plurality of light sources 10 and is not of condensing region of a single light source 10.

The optical component 70 according to certain embodiments of the invention will be described in detail below with reference to FIG. 1A. As described above, light emitted from the first light sources 10A (i.e., first semiconductor lasers 12A) with its minor axis direction (a major axis direction of near field pattern of the semiconductor laser) of the shape of condensing point (condensed spot shape) disposed in the first direction (right/left direction in the front view of the semiconductor laser etc. on the left side in FIG. 1A) passes through the corresponding collimating lens 13 and enters the diffusing layer 72 formed on the incident surface of the on the left side in FIG. 1A 70. At this time, the light emitted from the collimating lens 13 is in parallel to the optical axis 21 of the condensing lens 20, and the incident surface of the optical axis 70 and the incident surface of the light diffusing layer 72 formed on the incident surface of the optical component 70 are disposed perpendicular to the optical axis 21 of the condensing lens 20. Accordingly, emission from the collimating lens 13 enters perpendicularly on the incident surface of the light diffusing layer 72. The light incident on the light diffusing layer 72 becomes diffused light while passing through the light diffusing layer 72 and enters the optical component 70. The effect of the light diffusing layer 72 will be described in detail later below.

The optical component 70 has an emission-side surface that is an inclined optical surface 74 that has an inclination in the first direction that is the direction of the minor axis of shape of the condensing point (i.e., far field pattern) of the first semiconductor lasers 12A. Accordingly, light is emitted from the optical component 70 at a predetermined angle to the optical axis 21 of the condensing lens 20, and without changing the angle, enters the condensing lens 20 (see the side view in FIG. 1B). That is, light is incident on the condensing lens 20 at a predetermined angle (for example 0.25 to 2 degrees) not in parallel to the optical axis 21 of the condensing lens 20. Further, as shown in the front view of the semiconductor lasers etc., on the left side in FIG. 1A, the two optical components 70 that respectively correspond to the two first light sources 10A are disposed so that the inclinations of the inclined optical surfaces 74 are in opposite directions to each other.

Accordingly, light emitted from the two optical components 70 that respectively correspond to the two first light sources 10A are condensed at different positions on the phosphor wheel 30 (that is, on the phosphor region 32) through the condensing lens 20.

In a similar manner, light emitted from the second light source 10B (i.e., second semiconductor lasers 12B) with its minor axis direction (i.e., a major axis direction of near field pattern of the semiconductor laser) of the shape of condensing point disposed in the second direction (up/down direction in the front view of the semiconductor laser etc. on the left side in FIG. 1A) passes through the corresponding collimating lens 13 and enters the optical component 70. At this time, the light emitted from the collimating lens 13 is in parallel to the optical axis 21 of the condensing lens 20, and the incident surface of the optical component 70 is disposed perpendicular to the optical axis 21 of the condensing lens 20. Accordingly, emission from the collimating lens 13 enters perpendicularly on the incident surface of the optical component 70.

The optical component 70 has an emission-side surface that is an inclined optical surface 74 that has an inclination in the second direction that is the direction of the minor axis of shape of the condensing point (i.e., a major axis direction of near field pattern of the semiconductor laser) of the second semiconductor lasers 12A. Accordingly, light is emitted from the optical component 70 at a predetermined angle to the optical axis 21 of the condensing lens 20, and without changing the angle, enters the condensing lens 20 (see the plan view in FIG. 1A). That is, light is incident on the condensing lens 20 at a predetermined angle (for example 0.25 to 2 degrees) not in parallel to the optical axis 21 of the condensing lens 20. Further, as shown in the front view of the semiconductor lasers etc., on the left side in FIG. 1A, the two optical components 70 are disposed so that the inclinations of the inclined optical surfaces 74 are in opposite directions to each other.

Accordingly, light emitted from the two optical components 70 that respectively correspond to the two second light sources 10B are condensed at different positions on the phosphor wheel 30 (that is, on the phosphor region 32) through the condensing lens 20.

The inclination of the inclined optical surface 74 is formed in the minor axis direction of the condensed spot shape. Thus, the region where light emitted from the semiconductor lasers 12 overlap can be decreased and an appropriate reduction in the light density in the condensed region can be obtained. As in the present embodiment, in the case where the collimating lens 13 is offset from the focal point, the inclined optical surface 74 is oriented toward the major axis direction of the near field pattern of the semiconductor laser 12. Meanwhile, in the case where the collimating lens 13 is disposed to the focal point, the inclined optical surface 74 is oriented toward the minor axis direction of the near field pattern of the semiconductor laser 12.

Next, with referring to FIGS. 2A to 2C, a description will be given of an example of the shape of condensing point, obtained by condensing emissions from the two first light sources 10A and the two light sources 10B respectively provided with the corresponding optical components 70 having the inclined optical surfaces as described above, on the phosphor wheel 30 through the condensing lens 20.

Figure 2A:
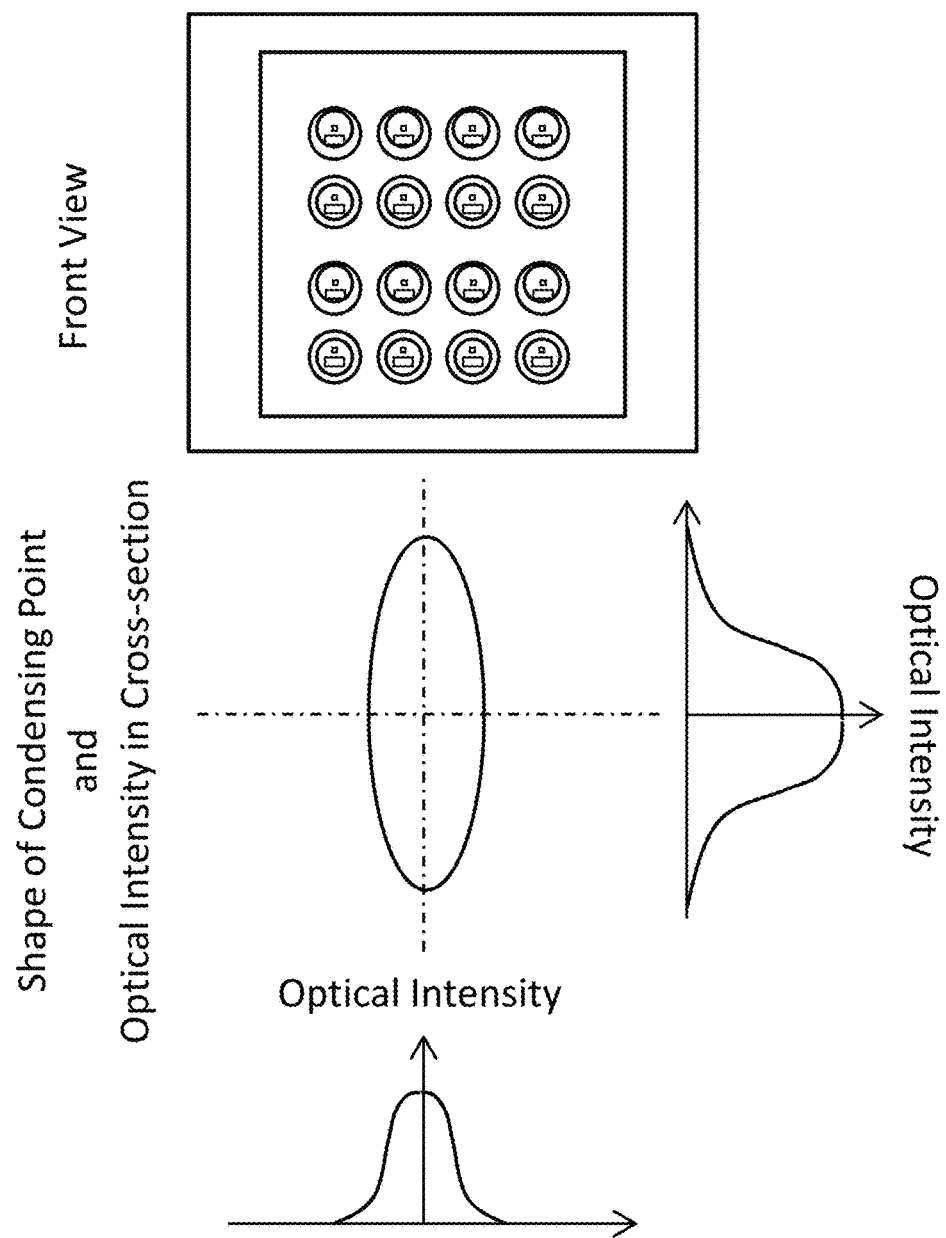
FIGS. 2A to 2C are diagrams showing shapes of condensing regions and optical intensity distributions (cross-sectional optical intensities) of light source devices according to certain embodiments of the invention.

FIG. 2A shows a shape of condensing point and an optical intensity in a cross section of an optical component 70 in a flat-plate shape in which the optical surface of the incident side and the optical surface of the emission side are in parallel to each other, and an inclined optical surface 74 is not provided. FIG. 2B shows a shape of condensing point and an optical intensity in a cross section, in the case where two optical components 70 corresponding to the second semiconductor lasers 12B are disposed. FIG. 2C shows a case that corresponds to the embodiment shown in FIG. 1A and FIG. 1B, where a shape of condensing point and an optical intensity in a cross section, in the case where two optical components 70 corresponding to the first semiconductor lasers 12A and two optical components 70 corresponding to the second semiconductors 12B are disposed.

Figure 2B:
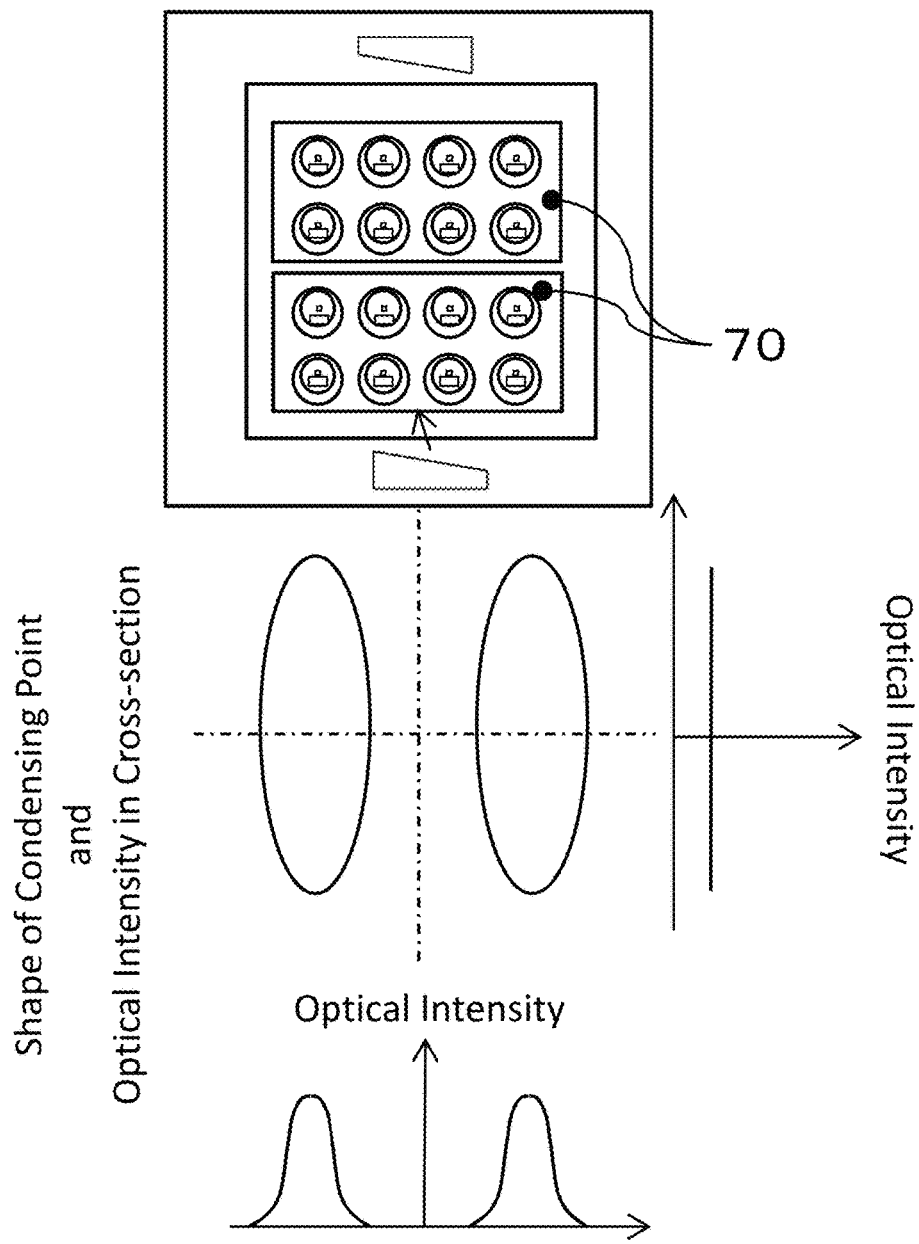
Figure 2C:
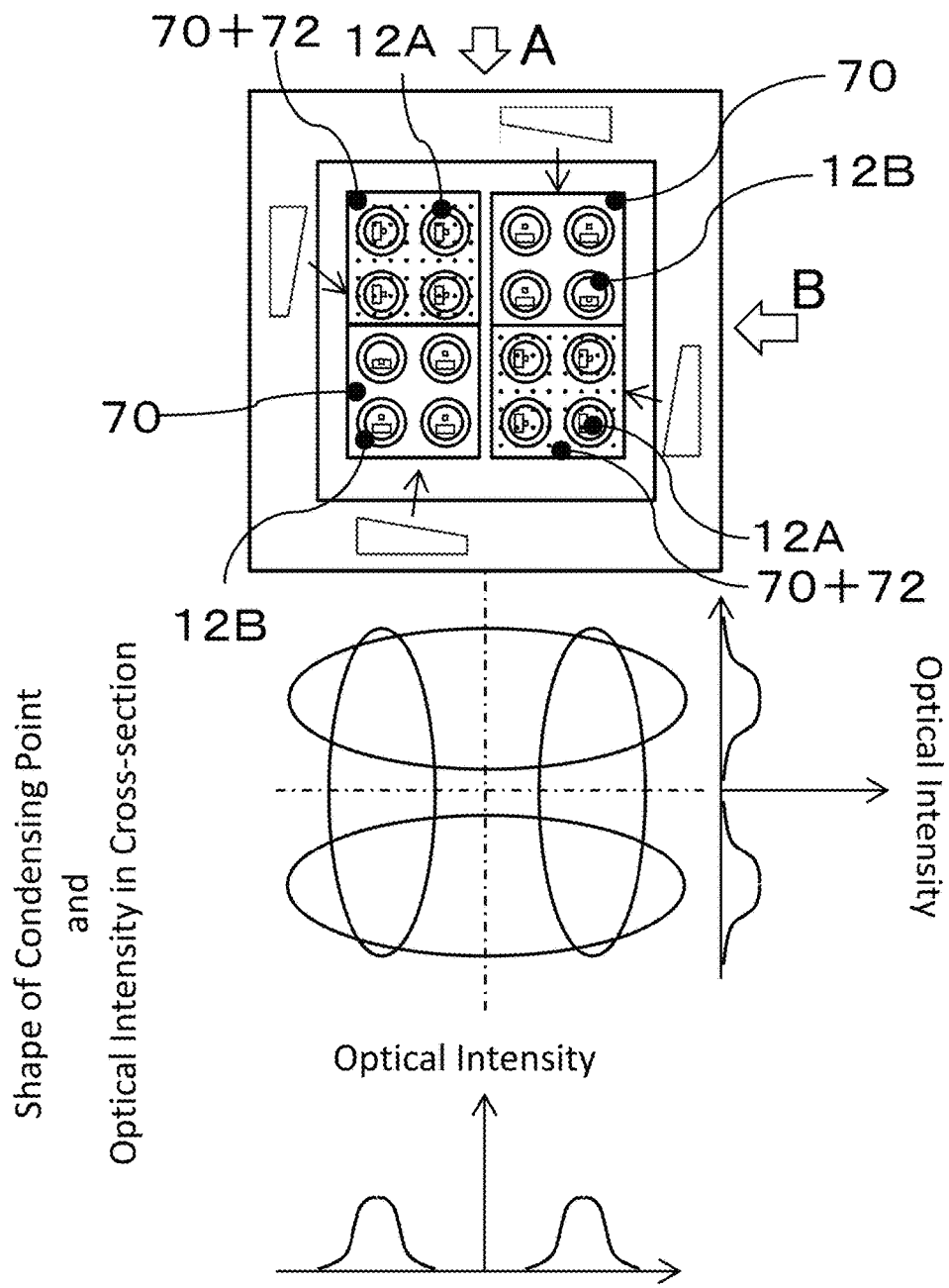

In either the case of FIG. 2B or FIG. 2C, two condensing points of elliptic shapes longer in a vertical direction are formed side by side in the lateral direction, when viewed on the drawing, by the two optical components 70 respectively corresponding to the second semiconductor lasers 12B. Accordingly, as shown in the diagrams of optical intensity of cross section at lower side in FIG. 2B and FIG. 2C, the emission from the second light sources 10B are not condensed at one spot (see the diagram of optical intensity of cross section of FIG. 2A) but separated in two peaks in the light intensity curve.

In FIG. 2C, in addition to two condensing points of elliptic shapes longer in a vertical direction formed side by side in the lateral direction, when viewed on the drawing, by the two optical components 70 respectively corresponding to the second semiconductor lasers 12B, two condensing points of elliptic shapes longer in a lateral direction are formed side by side in the vertical direction, when viewed on the drawing, by the two optical components 70 respectively corresponding to the first semiconductor lasers 12B. Accordingly, the emission from the first light sources 10A is also separated in two peaks in the light intensity curve. Thus, in the shape of condensing point in FIG. 2C, the condensed light is separated in four peaks.

In FIG. 1A and FIG. 1B, the optical components 70 have inclined optical surfaces 74 inclining in opposite directions with same inclination angles, but inclined optical surfaces with different inclination angles can also be employed.

When the peak optical intensity of single condensing regions is assumed as the initial peak optical intensity Po, the peak optical intensities of cases in FIG. 2B and FIG. 2C are given by:

$P = Po/$(number of condensing regions; 2 in FIG. 2B, and 4 in FIG. 2C).

That is, the value of the peak optical intensity is obtained by dividing the initial peak optical intensity Po by the number of the condensing regions. Thus, in the present example, the peak optical intensity of the case of FIG. 2B is ½, and the case of FIG. 2C is ¼, respectively relative to the initial intensity.

Through the optical components 70 with the inclined optical surfaces 74, the light from the collimating lenses 13 are made incident on the condensing lens 20 at predetermined angles to the optical axis of the condensing lens 20, and the angles are preferably in a range of 0.25 to 2 degrees as the absolute values. With the inclination angles in a range of 0.25 to 2 degrees as the absolute values, the area of the condensing region SP (see FIG. 4A) on the phosphor wheel 30 (in the phosphor region) can be reduced to be not too large. In the embodiment shown in FIG. 1A and FIG. 1B, other than the case employing a same inclination angle to the optical components 70, appropriate inclination angles can be employed, and the optical components 70 may have different inclination angles to each other.

In the present embodiment, as described above, the light diffusing layer 72 is formed on the incident surface of the optical component 70 corresponding to the first light source 10A, that is, the light diffusing layer 72 is formed on the optical path of the light emitted from the first light source 10A, so that diffused light is formed through the light diffusing layer 72. Thus, light can be condensed into a wider area in the condensing region compared to the case absence of the light diffusing layer. As shown in FIG. 2C, the light emitted from the first light source 10A passes through the light diffusing layer 72 and the optical component 70 and enters the condensing lens 20. The light is then condensed by the condensing lens 20 to form a condensing point of an elliptic shape longer in a lateral direction on the drawing. Also, the light emitted from the second light source 10B passes through the optical component 70 and enters the condensing lens 20. Then, the light is condensed by the condensing lens 20 to form a condensing point of an elliptic shape longer in a vertical direction on the drawing. In this case, the length of the major axis of the elliptic shape formed by the first light source 10A is longer than the length of the major axis of the elliptic shape formed by the second light source 10B. This is because the light is made into diffused light by the light diffusing layer 72 that forms a larger shape on the condensing region (i.e., increase the size of the shape of condensing point).

Accordingly, in the present embodiment, the shape of a condensing point (beam shape) with a laterally long or a longitudinally long aspect ratio can be obtained on the phosphor wheel 30 (i.e., on the phosphor region) in the condensing region of the condensing lens 20. Accordingly, by appropriately selecting the diffusion intensity of the light diffusing layer 72, the shape of condensing point (beam shape) with a desired size and a desired aspect ratio can be obtained.

Also, the light can be condensed on different positions through the optical component 70 having the inclined optical surface 74, which also allows adjustment of the size of the shape of condensing point (beam shape). For example, a shape of condensing point (beam shape) with a desired size and a desired aspect ratio may be longitudinally 1.5 mm and laterally 2 mm, but any other appropriate shape can be employed. A shape of a longitudinal length of 1.5 mm and a lateral length of 2 mm can be produced with the use of a light diffusing layer having a diffusion coefficient that allows obtaining of an aspect ratio of about 1.33 (=2 mm/1.5 mm).

Examples of the light diffusing layer 72 includes a layer containing a light diffusing material composed of particles of such as $SiO_2$, $TiO_2$, $Ba_2SO_4$, or the like. The light diffusing material preferably has a particle diameter in a range of 0.1 to 100 μm, and a range of 1 to 50 μm is more preferable. Such a layer can be formed on the surface of the optical component 70 by way of coating or the like. The light diffusing layer can be made of a material having a large number of foams therein, and other appropriate materials and configurations that allow for formation of a light diffusing layer can also be used for the light diffusing layer. Other embodiments regarding the light diffusing layer will be described in detail later below.

In the present embodiment, an optimum degree of diffusion, namely the diffusion angle, corresponding to the aspect ratio of the shape of condensing point can be obtained by setting the size and/or the amount of the light diffusing body, air bubbles, or the like. Further, an optimum degree of diffusion can be set according to the intensity of light from the light source, the characteristics of the phosphor layer (for example, degree of influence on the wavelength converting efficiency that is affected by incident light of high light density, luminosity factor, and so forth), the distance between the light diffusing layer 72 and the phosphor region 32.

A light source device according to Embodiment 1 includes a plurality of light sources each having a semiconductor laser and a collimating lens, a condensing lens to condense light from the light sources, an optical component disposed between the light source and the condensing lens, and a phosphor wheel having a phosphor and allowing light condensed by the condensing lens to pass therethrough. The optical component has an inclined optical surface that inclines from the plane perpendicular to the optical axis of the collimating lens, and the inclined optical surface has different inclination angles for each of the light sources. Some of the semiconductor lasers are first semiconductor lasers having a short axis of the shape of its condensed spot aligned in a first direction and some of the semiconductor lasers are second semiconductor lasers having a short axis of the shape of its condensed spot aligned in a second direction that is different from the first direction. A light diffusing layer is disposed in the optical path of the emitting light of either the first semiconductor laser or the second semiconductor laser. A light diffusing layer is disposed in the optical path of the emitting light of either the first semiconductor laser or the second semiconductor laser.

According to the present embodiment, the optical component disposed between the light sources and the condensing lens has an inclined optical surface that inclines from the plane perpendicular to the optical axis of the collimating lens, and the inclined optical surface has different inclination angles for each of the light sources. Thus, light emitted from the light sources are condensed by the condensing lens to different locations on the phosphor wheel (that is, on the phosphor). With this configuration, the light density at the condensing regions on the phosphor can be reduced, so that the emission from the phosphor can be efficiently used.

Further, some of the semiconductor lasers are first semiconductor lasers having a short axis of the shape of its condensed spot aligned in a first direction and some of the semiconductor lasers are second semiconductor lasers having a short axis of the shape of its condensed spot aligned in a second direction that is different from the first direction, and a light diffusing layer is disposed in the optical path of the emitting light of either the first semiconductor lasers or the second semiconductor lasers, so that condensed spot shapes (i.e., beam shapes to condensed spots, hereinafter may be abbreviated to "beam shapes") of different sizes are produced. Thus, the condensed spot shape (beam shape) of a desired size and a desired aspect ratio can be obtained at the condensing region of the condensing lens. Also, the light can be condensed on different positions through the optical component 74 having the inclined optical surface 74, which also allows adjustment of the size of the shape of condensing point (beam shape).

Figure 8:
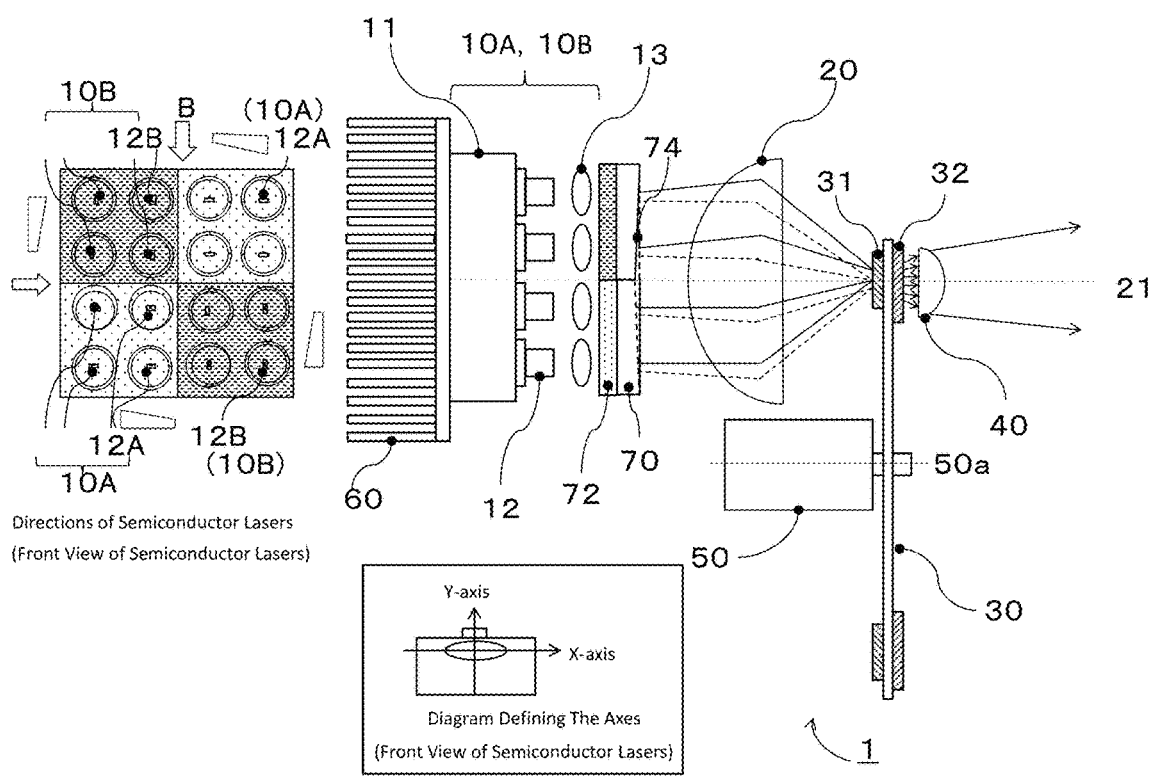
FIG. 8 is a schematic diagram including a schematic plan view illustrating a light source device according to one other embodiment of the invention.

Also, as shown in FIG. 8, a diffusion layer 72 may be disposed on the optical paths of light emitted from the light source 10A having first semiconductor lasers 12A and light emitted from the light source 10B having second semiconductor lasers 12B, where the diffusion coefficient of the diffusion layer may be different for the first semiconductor lasers 12A and the second semiconductor lasers 12B. Accordingly, by appropriately selecting the diffusion intensity of the light diffusing layer 72, the shape of condensing point (beam shape) with a desired size and a desired aspect ratio can be obtained.

Further, the use of an expensive component such as a diffraction optical element is not required. Thus, according to the present embodiment, the light source device that employs a plurality of semiconductor lasers, and in which a decrease in the luminous efficiency of the phosphor can be reduced and further, a condensed spot shape (beam shape) with a desired size and a desired aspect ratio can be obtained at its condensed region, can be provided with a low manufacturing cost.

The expression "the optical component has different inclined optical surfaces which are different for each of the light sources" includes the case of different inclination angles and also the case where inclined optical surfaces of a same inclination angle are disposed in different directions. Also, the case where some of the light sources may have a same inclination angle and are disposed in a same direction. Further, in the case where the inclination angles of a same inclination angle are disposed in a same direction and adjacent to each other, the inclined optical surfaces that are adjacent to each other may be integrally formed.

The optical component is formed for each of the light sources, so that a very suitable condensed spot shape (beam shape) can be obtained, and thus, detailed adjustments can be performed. According to the present embodiment, the light diffusing layer is formed on the optical surface of the optical component, so that a condensed spot shape (beam shape) with a desired aspect ratio can be obtained in a compact light source device.

In some cases, the light diffusing layer 72 may be disposed on the optical surface of the optical component 70 that is perpendicular to the optical axis of the collimating lens 13 as shown in FIG. 1A and FIG. 1B, and in some cases, the light diffusing layer 72 may be disposed on the inclined optical surface of the optical component 70. Also, the light diffusing layer 72 can be provided as an independent component and disposed at an appropriate position between the light source and the condensing lens 20, on the optical path of light emitted from the light source 10.

According to the present embodiment, two first light sources having the inclined optical surface provided by 180° to the opposite direction and two second light sources having the inclined optical surface provided by 180° to the opposite direction are at least included, so that two condensed spot shapes (beam shapes) formed by the first light sources and two condensed spot shapes (beam shapes) formed by the second light sources can be obtained at locations symmetrical with respect to the optical axis of the condensing lens. Thus, a condensed spot shape (beam shape) that is widened to a predetermined degree centering the optical axis of the condensing lens can be obtained.

According to the present embodiment, the inclination of the inclined optical surface of the optical component is formed in the rotating direction (also can be referred to as "a direction in a short axis of the condensed spot shape") that centers the long axis of the condensed spot shape of the semiconductor lasers. Thus, the region where light emitted from the semiconductor lasers overlap can be decreased and a reduction in the light density in the condensed region can be appropriately obtained.

According to the present embodiment, the first direction and the second direction are disposed at an angle of 90 degrees, so that with the use of the light diffusing layer, a condensed spot shape (beam shape) with a desired aspect ratio can be securely obtained.

According to the present embodiment, the inclined optical surface is formed at an inclination angle in a range of 0.25 to 2 degrees with respect to the plane perpendicular to the optical axis of each of the collimating lenses, so that light can be converged at different positions in an appropriate range.

Further, even in the case where the phosphor 32R adapted to emit light in a red wavelength range tends to exhibit a large decrease in the wavelength conversion efficiency, according to the present embodiment, the light density in the condensing region on the phosphor region can be reduced, so that deterioration of the wavelength converting efficiency can be reduced.

Figure 3A:
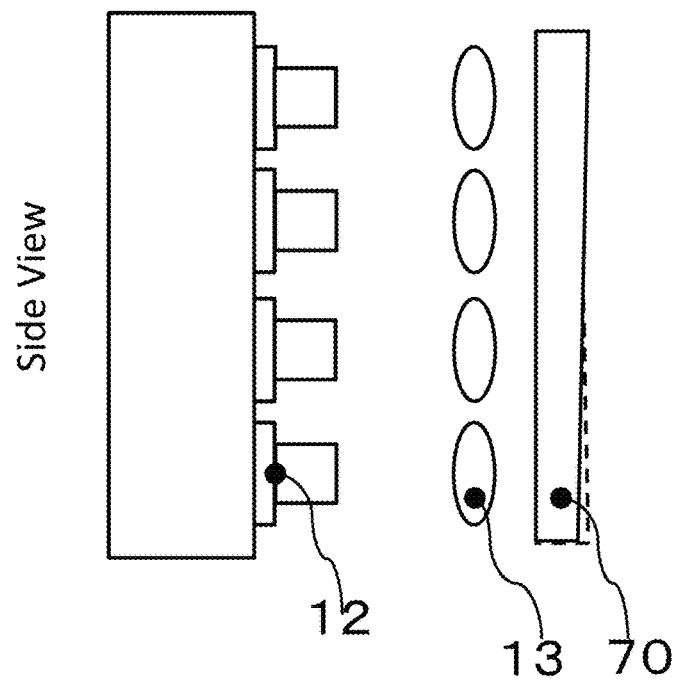
FIGS. 3A to 3C are diagrams showing shapes of condensing regions and cross-sectional optical intensities in the cases of changing positions of lens array formed with a plurality of collimating lenses and of having a light diffusing layer.
Figure 3A:
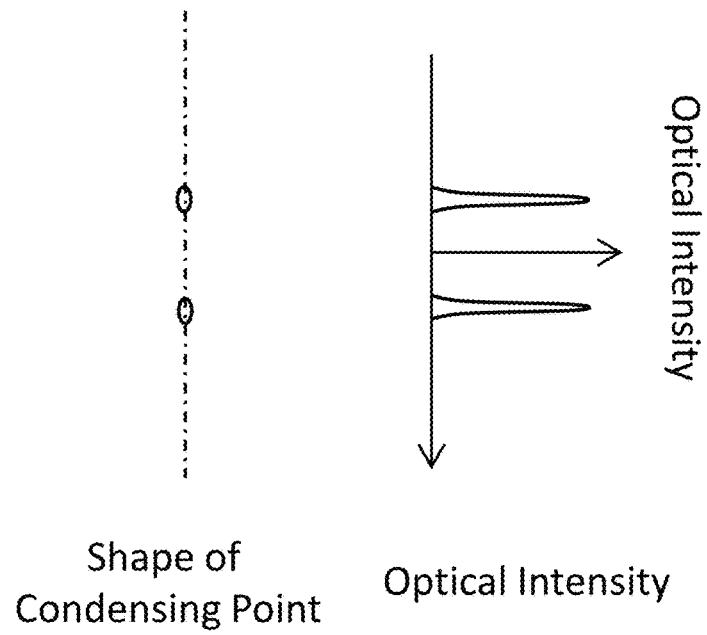
Figure 3B:
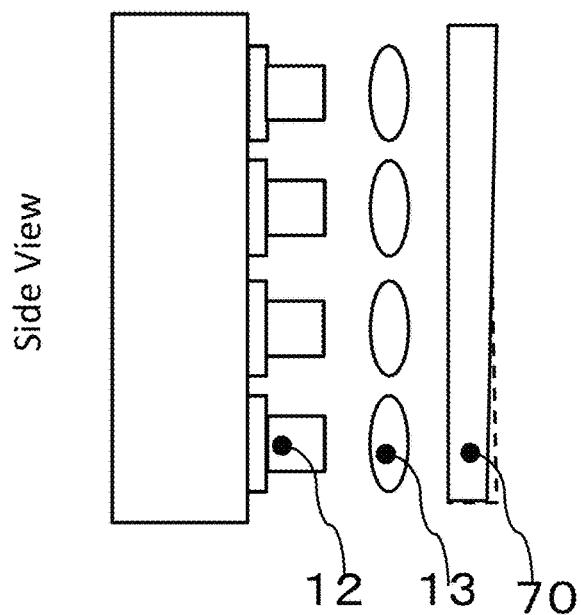
Figure 3B:
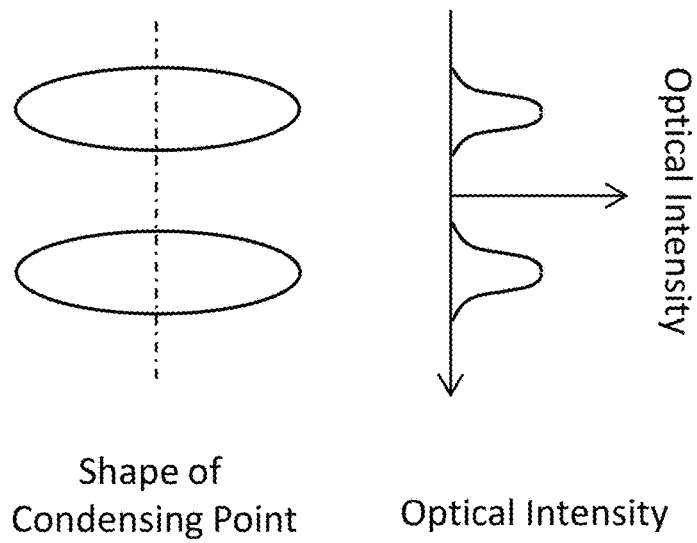
Figure 3C:
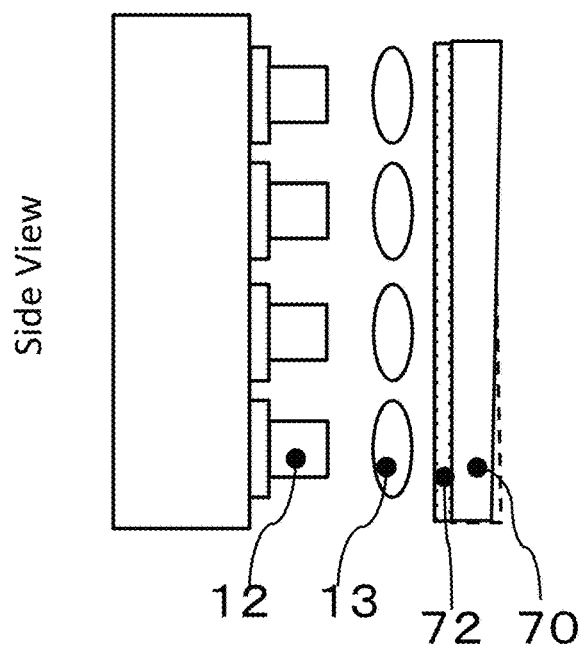
Figure 3C:
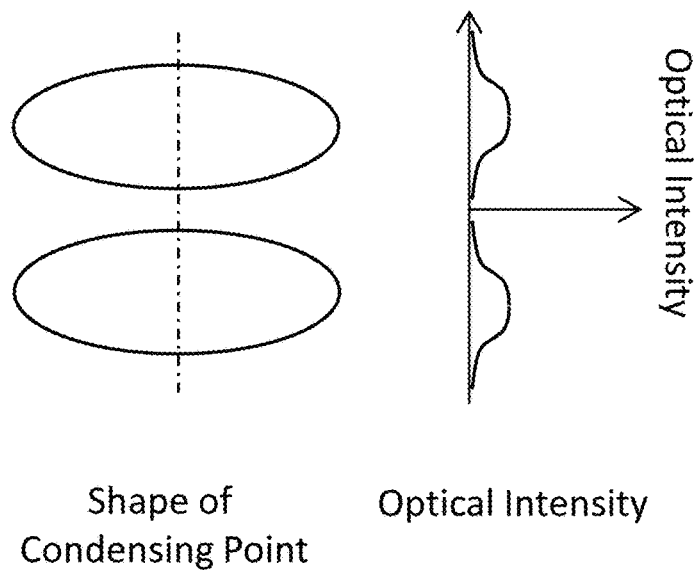

Next, referring to FIGS. 3A to 3C, the relationship between the position of the collimating lenses and the optical intensity will be described. In FIGS. 3A to 3C, the arrangements of the semiconductor lasers 12, the collimating lenses 13, the optical components 70 are schematically shown at upper side in the figures, and the shapes of condensing point (beam shape) and the optical intensities at cross section are shown at lower side in the figures. In FIGS. 3A and 3B, the semiconductor lasers 12, the collimating lenses 13, and the optical components 70 are described. FIG. 3A illustrates a case where the collimating lenses 13 are disposed at positions in the optical axis direction to emit parallel light, that is, disposed at the focal point positions. FIG. 3B illustrates a case where the collimating lenses 13 are offset from the focal point positions (i.e., positions in the optical axis direction to emit parallel light). In FIG. 3C, in addition to the state shown in FIG. 3B, the light diffusing layer 72 is further disposed.

As shown in FIG. 3A, in the case where the collimating lenses 13 are disposed at the focal point positions (i.e., positions in the optical axis direction to emit parallel light), the shape of the condensing point at the condensing region is small and the peak optical intensity is high (i.e., high light density). As shown in FIG. 3A, in the case where the collimating lenses 13 are disposed at the focal point positions (i.e., positions in the optical axis direction to emit parallel light), the shape of the condensing point at the condensing region is small and the peak optical intensity is high (i.e., high light density). Thus, by offsetting the collimating lenses 13 from the focal point positions (i.e., positions in the optical axis direction to emit parallel light), the area of the condensing region can be increased and the light density of the condensing light can be reduced.

According to the present embodiment, each of the collimating lenses is disposed at a position different from a position along the optical axis that allows emission of parallel light, so that light density in the condensing region on the phosphors can be reduced, and also the size of the condensed spot shape (beam shape) can be adjusted.

Thus, by offsetting the collimating lenses 13 from the focal point positions (i.e., positions in the optical axis direction to emit parallel light), the area of the condensing region can be increased and the light density of the condensing light can be reduced. According to the present embodiment, the first direction and the second direction are disposed at an angle of 90 degrees, so that with the use of the light diffusing layer, a condensed spot shape (beam shape) with a desired aspect ratio can be securely obtained.

In FIG. 3A, the shape of the condensing point in the case of placing the collimating lens 13 to the focal point position, that is, the arrangement position to emit parallel light, is schematically shown small in size. But according to usage, in certain embodiments, the collimating lens 13 can be disposed to the focal point position that is an arrangement position in the optical axis direction to emit parallel light.

Figure 5:
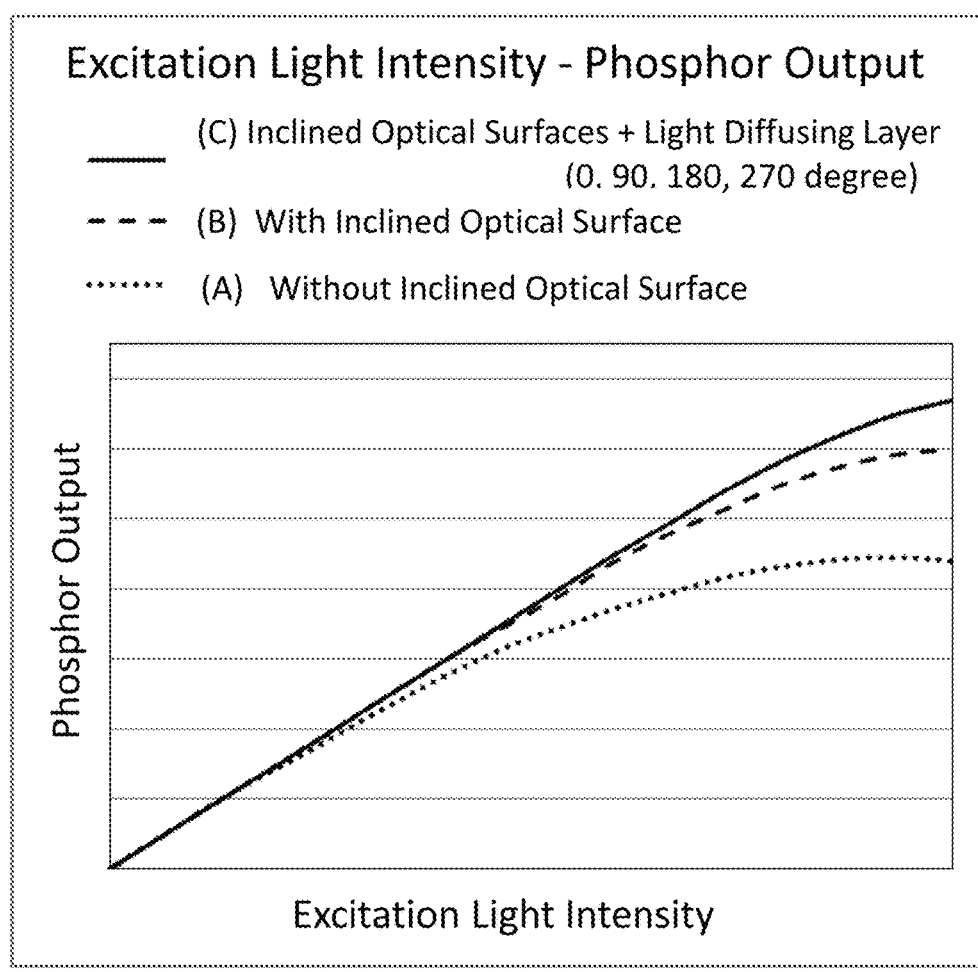
FIG. 5 is a graph showing a relation between intensity of the excitation light and output intensity of the phosphor.

Next, referring to the graphs in FIG. 5, the output efficiency of the phosphor in the cases of presence or absence of the inclined optical surfaces 74 and in the cases of presence or absence of the light diffusing layer 72.

FIG. 5 shows the relationships between the optical output powers of the phosphor and the excitation light output powers of the light sources. In FIG. 5, the dotted line (A) indicates a case absent of both the inclined optical surface 74 and the light diffusing layer 72, the broken like (B) indicates a case presence of the inclined optical surface 74 but absent of the light diffusing layer 72, and the solid line (C) indicates a case presence of both the inclined optical surface 74 and the light diffusing layer 72.

In the case indicated by the dotted line (A), absence of both the inclined optical surface 74 and the light diffusing layer 72, with a rise of excitation output, the output power of the phosphor reaches a peak and decreases. In the case indicated by the dotted line (B), presence of the inclined optical surface 74 but absent of the light diffusing layer 72, with a rise of excitation output, the output power of the phosphor also rises but starts to gradually saturate.

On the other hand, in the case indicated by the dotted line (C), presence of both the inclined optical surface 74 and the light diffusing layer 72, saturation of the output power of the phosphor can be suppressed, so that even in the case of high output from the light source 10, the phosphor can be used efficiently. This is achieved by reducing the light density in the condensing region, reduction in the luminous efficiency of the phosphor can also be reduced.

Thus, with a combination of the inclined optical surface 74 and the light diffusing layer 72, light emitted from a plurality of light sources 10 are condensed at different positions on the phosphor region with large condensing diameters, which are sufficient to reduce the light density, so that reduction in the luminous efficiency of the phosphor can be sufficiently reduced.

As described above, in the light source device 1 according to certain embodiments, the condensing regions of a plurality of light sources 10 are offset to each other through the optical components 70 having inclined optical surfaces 74, so that light density in the condensing regions on the phosphor region can be reduced. Also, by decondensing the collimating lens 13, the shape of the condensing region of the phosphor can be expanded without sacrificing the etendue and the light density can be reduced. Further, through the light diffusing layer, the shape of the condensing region of the phosphor can be expanded without sacrificing the etendue and the light density can be reduced. Accordingly, deterioration of the light converting efficiency can be reduced, so that the phosphor can be used efficiently. Further, the light sources 10 of the same shape can be incorporated with different arrangement, so that mass productivity is not sacrificed.

Other than that illustrated in the embodiment described above, an appropriate number of at least four of the light sources 10 can be employed, in which, any appropriate number of the semiconductor lasers 12 can be used in a single light source 10.

In the description of the embodiments provided above, the expression "the first direction and the second direction differ by 90 degrees" is synonymous with "the first direction and the second direction are disposed at an angle of 90 degrees".

In the embodiments described above, configurations that employ both the optical component 70 having an inclined optical surface 74 and the light diffusing layer 72 are employed, but any other appropriate configuration may be employed. For example, a configuration may be such that the light diffusing layer 72 is not provided and an optical component 70 that serves as a light diffusing layer is provided on the optical path of light emitted from either the first semiconductor laser 12A or the second semiconductor laser 12B. Referring to FIGS. 6A to 6D, other embodiments of the optical component will be described below. FIGS. 6A to 6D are schematic diagrams showing optical components according to other embodiments.

Figure 6A:
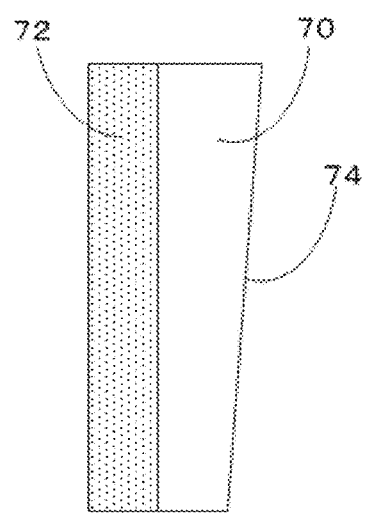
FIGS. 6A to 6D are schematic diagrams showing optical components according to other embodiments of the invention.
Figure 6B:
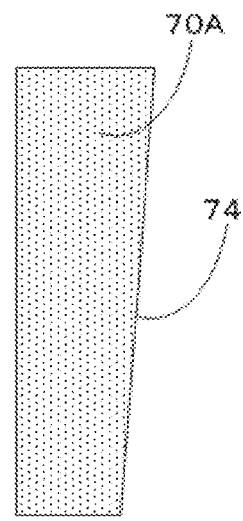

FIG. 6A shows a case where both of the above-described optical component 70 and light diffusing layer 72 are provided. Meanwhile, in the embodiment shown in FIG. 6B, instead of separately providing the light diffusing layer, air bubbles are incorporated into the optical component 70A, or a light diffusing material composed of particles of such as $SiO_2$, $TiO_2$, $Ba_2SO_4$ are incorporated to diffuse the light passing therethrough. Also, in such embodiments, in order to obtain an optimum degree of diffusion, i.e., diffusion angles corresponding to the aspect ratio necessary to the shape of condensing point, the size and/or amount of the light diffusing body and air bubbles can be set. As for the size of the air bubbles and the particle size of the diffusing body, a similar size or the like, of the above-described embodiments can be used.

Figure 6C:
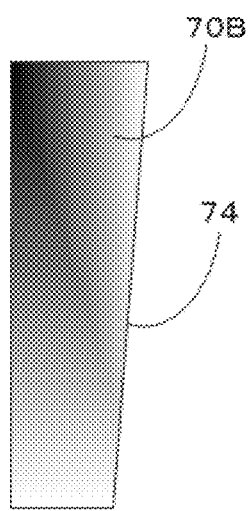

In the embodiment shown in FIG. 6C, a separate light diffusing layer is not provided and instead the optical component 70B is made of a glass and with different varying index, which allows diffusing light that passed through the optical component 70B. Also, in the present embodiment, corresponding to the aspect ratio necessary to the shape of condensing point, refractive index can be adjusted.

Figure 6D:
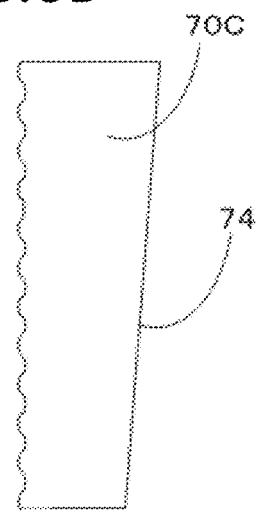

In the embodiment shown in FIG. 6D, a separate light diffusing layer is not provided and instead an irregularity is formed on the surface of the optical component 70C, which allows diffusion of the light. Also, in the present embodiment, in order to obtain an optimum diffusion coefficient corresponding to the aspect ratio necessary to the shape of condensing point, the size and pitch of the irregularity can be set.

Figure 7:
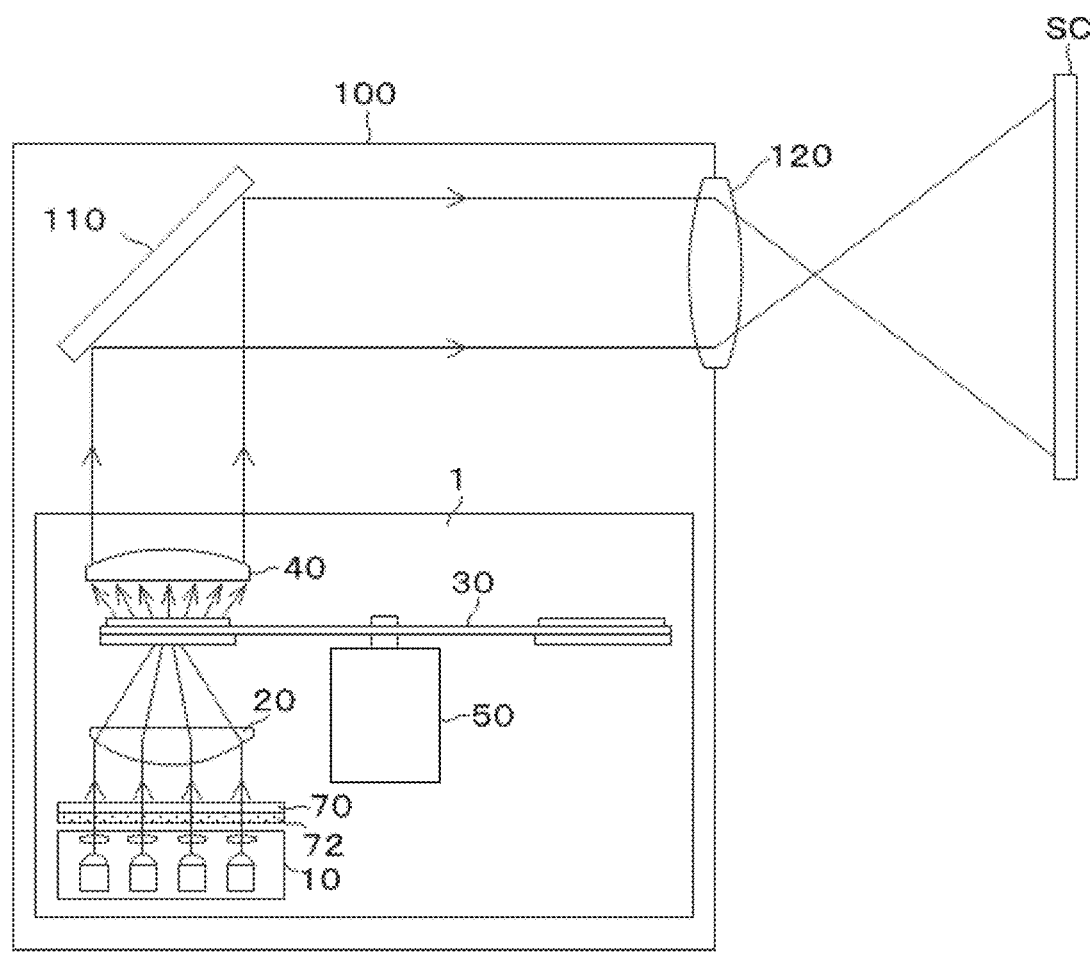
FIG. 7 is a schematic diagram showing a configuration of a projector 100 that has a light source according to one embodiment of the invention.

Next, referring to FIG. 7, description will be given of a case where the light source device 1 illustrated in the embodiments above is used as a light source device in a 1-chip DBP projector. FIG. 7 is a schematic diagram illustrating a configuration of a projector 100 provided with the light source device 1 shown in the embodiments described above, being a schematic plan view seeing the light source device 1 and the projector from above.

The light emitted from the light source device 1 is reflected by a DMD (Digital Micromirror Device) element 110 that is a spatial light modulator. Then, the light is condensed using a projecting device such as a projecting lens 120 and projected on a screen SC. In the DMD element, fine mirrors corresponding to the pixels of an image projected on the screen are disposed in a matrix. The angle of each of the mirrors can be changed to turn ON/OFF the light emitted to the screen on the order of microseconds.

Further, the shade of the light incident on the projecting lens is altered by the ratio between the mirror ON time and the mirror OFF time, so that the shading display based on the image data of the projected image can be realized.

In the present embodiment, a DMD element is used as an optical modulating element, but any other appropriate optical modulating element can be used according to the purpose of use. Further, the light source device 2 according to certain embodiments of the present invention and the projector using the light source device 2 are not limited to the embodiment described above and the present invention includes other various embodiments.

As described above, a light source device according to one embodiment employs a plurality of semiconductor lasers, and can reduce a decrease in the luminous efficiency of the phosphor. Further, in the light source device, a condensed spot shape (beam shape) with a desired size and a desired aspect ratio can be obtained at its condensed region, and the light source device can be provided with a low manufacturing cost. Consequently, a projector employing the light source device can be provided with a low manufacturing cost.

Various embodiments of the invention have been shown and described, in which modifications of the above-described configurations may occur and combinations of the components and changes in the orders in the embodiments that can be realized without departing from the scope and technical idea of the invention.

DENOTATION OF REFERENCE NUMERALS

1 light source device
10 light source unit
11 housing
12 semiconductor laser element
13 collimating lens
20 condensing lens
21 axis of condensing lens
30 phosphor wheel
31 dielectric multilayer film
32 fluorescent material
40 light receiving lens
50 rotation driving unit
50a driving shaft
60 heat dissipating member
70 optical component
72 light diffusing layer
74 inclined optical surface
100 projector
110 DMD element
120 projecting lens
SC screen
SP condensing region
FL light emitting region of phosphor

What is claimed is:
1. A light source device, comprising:
a plurality of light sources each having a semiconductor laser and a collimating lens;
a condensing lens configured to condense light from the light sources;

an optical component disposed between the light sources and the condensing lens, and configured to allow light from the light sources to pass therethrough; and a phosphor wheel having phosphors and configured to allow light condensed by the condensing lens to pass therethrough, wherein the optical component has a plurality of inclined optical surfaces, each of the plurality of inclined optical surfaces inclining at an inclination angle from a plane perpendicular to an optical axis of at least one of the collimating lenses, each of the inclination angles of the plurality of inclined optical surfaces with respect to corresponding light sources being different from each other, wherein, of the plurality of the light sources, some of the semiconductor lasers are first semiconductor lasers having a short axis of a shape of condensing point aligned in a first direction and some of the semiconductor lasers are second semiconductor lasers having a short axis of a shape of condensing point aligned in a second direction that is different from the first direction, and wherein a light diffusing layer is formed in optical paths of light emitted from either the first semiconductor lasers or the second semiconductor lasers.

2. The light source device according to claim 1, wherein the light diffusing layer is formed on an optical surface of the optical component.

3. The light source device according to claim 1, wherein the plurality of light sources include at least two first light sources corresponding with an inclined optical surface having an inclination angle that is 180 degrees from the first direction, and at least two second light sources corresponding with an inclined optical surface having an inclination angle that is 180 degrees from the second direction.

4. The light source device according to claim 1, wherein a condensed spot shape that is widened to a predetermined angle and centered on the optical axis of the condensing lens is formed.

5. The light source device according to claim 1, wherein an angle between the first direction and the second direction is 90 degrees.

6. The light source device according to claim 1, wherein the light sources are disposed on a same surface of a support member.

7. The light source device according to claim 1, wherein at least one inclined optical surface is formed at an inclination angle in a range of 0.25 to 2 degrees with respect to the plane perpendicular to the optical axis of each of the collimating lenses.

8. The light source device according to claim 1, wherein each of the collimating lenses is disposed at a position different from a position along the optical axis that allows emission of parallel light.

9. A light source device, comprising:
a plurality of light sources each having a semiconductor laser and a collimating lens;
a condensing lens configured to condense light from the light sources;
an optical component disposed between the light sources and the condensing lens, and configured to allow light from the light sources to pass therethrough; and
a phosphor wheel having phosphors and configured to allow light condensed by the condensing lens to pass therethrough,
wherein the optical component has a plurality of inclined optical surfaces, each of the plurality of inclined optical surfaces inclining at an inclination angle from a plane perpendicular to an optical axis of at least one of the collimating lenses, each of the inclination angles of the plurality of inclined optical surfaces with respect to corresponding light sources being different from each other,
wherein, of the plurality of the light sources, some of the semiconductor lasers are first semiconductor lasers having a short axis of a condensed spot shape aligned in a first direction and some of the semiconductor lasers are second semiconductor lasers having a short axis of a condensed spot shape aligned in a second direction that is different from the first direction, and
wherein a light diffusing layer is disposed on the optical paths of the first semiconductor lasers and the second semiconductor lasers, at a location between the light sources and the condensing lens, and the light diffusing layer exhibits diffusion coefficients with respect to light emitted-from the first semiconductor lasers and to light emitted from the second semiconductor lasers.

10. The light source device according to claim 9, wherein the light diffusing layer is formed on an optical surface of the optical component.

11. The light source device according to claim 9, wherein the plurality of light sources include at least two first light sources corresponding with an inclined optical surface having an inclination angle that is 180 degrees from the first direction, and at least two second light sources corresponding with an inclined optical surface having an inclination angle that is 180 degrees from the second direction.

12. The light source device according to claim 9, wherein a condensed spot shape that is widened to a predetermined angle and centered on the optical axis of the condensing lens is formed.

13. The light source device according to claim 9, wherein an angle between the first direction and the second direction is 90 degrees.

14. The light source device according to claim 9, wherein the light sources are disposed on a same surface of a support member.

15. The light source device according to claim 9, wherein at least one inclined optical surface is formed at an inclination angle in a range of 0.25 to 2 degrees with respect to the plane perpendicular to the optical axis of each of the collimating lenses.

16. The light source device according to claim 9, wherein each of the collimating lenses is disposed at a position different from a position along the optical axis that allows emission of parallel light.

17. The light source device according to claim 9, wherein the support member comprises a heat dissipating member.

18. The light source device according to claim 9, wherein the light sources are configured to emit light in a wavelength band of 370 nm to 500 nm.

19. An optical device according to claim 9, wherein one of the phosphors is configured to emit light that contains a red light.

20. A projector, comprising:
the light source device according to claim 9;
a light modulating device configured to form an image by successively modulating light of a plurality of wavelengths emitted by the light source device, based on image data; and
a projecting device configured to enlarge and project the image.

* * * * *